(12) United States Patent
MacKenzie et al.

(10) Patent No.: US 10,210,115 B2
(45) Date of Patent: Feb. 19, 2019

(54) SYSTEM FOR HANDLING EVENT MESSAGES FOR FILE COLLABORATION

(71) Applicant: Box, Inc., Redwood City, CA (US)

(72) Inventors: David MacKenzie, San Francisco, CA (US); Alex Treyger, San Jose, CA (US); Priyanka Reddy, Cupertino, CA (US); Miles Spielberg, Sunnyvale, CA (US)

(73) Assignee: BOX, INC., Redwood City, CA (US)

( * ) Notice: Subject to any disclaimer, the term of this patent is extended or adjusted under 35 U.S.C. 154(b) by 213 days.

(21) Appl. No.: 14/980,924

(22) Filed: Dec. 28, 2015

(65) Prior Publication Data

US 2016/0357778 A1   Dec. 8, 2016

Related U.S. Application Data

(60) Provisional application No. 62/170,025, filed on Jun. 2, 2015.

(51) Int. Cl.
*G06F 17/30* (2006.01)
*G06F 13/36* (2006.01)

(52) U.S. Cl.
CPC ........ *G06F 13/36* (2013.01); *G06F 17/30174* (2013.01)

(58) Field of Classification Search
USPC ......................................... 707/672
See application file for complete search history.

(56) References Cited

U.S. PATENT DOCUMENTS

| | | | |
|---|---|---|---|
| 2005/0198300 A1* | 9/2005 | Gong | G06F 17/30905 709/227 |
| 2008/0120288 A1* | 5/2008 | Guan | G06F 17/30867 |
| 2010/0030824 A1* | 2/2010 | Shang | G06F 11/2094 707/E17.044 |

* cited by examiner

*Primary Examiner* — Baoquoc N To
(74) *Attorney, Agent, or Firm* — Trellis IP Law Group, PC

(57) ABSTRACT

A system and method for facilitating client software access to messages, such as event messages, generated in a networked computing environment, such as a file-collaboration system. An example method uses a message bus and accompanying Application Programming Interfaces (APIs) to allow collaborators to employ client software to interface with highly scalable and organized message bus records, maintained via an underlying distributed database. The APIs and associated interface allow client software; not limited to collaboration software clients; to efficiently publish to, subscribe to, and obtain information about event records of the message bus. An embodiment allows selective load balancing and deferral of event message processing; efficient message offset handling and data center failover functionality, and so on.

20 Claims, 11 Drawing Sheets

SYSTEM FOR HANDLING EVENT MESSAGES FOR FILE COLLABORATION

CLAIM OF PRIORITY

This application claims priority from the following: U.S. Provisional Patent Application Ser. No. 62/170,025, entitled SYSTEM FOR HANDLING EVENT MESSAGES FOR FILE COLLABORATION, filed on Jun. 2, 2015, which is hereby incorporated by reference as if set forth in full in this application for all purposes.

CROSS REFERENCES TO RELATED APPLICATIONS

This application is related to U.S. Pat. No. 9,015,248, entitled MANAGING UPDATES AT CLIENTS USED BY A USER TO ACCESS A CLOUD-BASED COLLABORATION SERVICE, filed Jun. 18, 2012, with a priority date of Nov. 16, 2011, which is hereby incorporated by reference as if set forth in full in this application for all purposes.

This application is related to the following U.S. patent application Ser. No. 13/937,060, entitled SYSTEM AND METHOD FOR PERFORMING SHARD MIGRATION TO SUPPORT FUNCTIONS OF A CLOUD-BASED SERVICE, filed on Jul. 8, 2013;

U.S. patent application Ser. No. 14/835,599, entitled DATA TRANSFER IN A COLLABORATIVE FILE SHARING SYSTEM, filed on Aug. 25, 2015;

U.S. patent application Ser. No. 14/194,091, entitled SCALABILITY IMPROVEMENT IN A SYSTEM WHICH INCREMENTALLY UPDATES CLIENTS WITH EVENTS THAT OCCURRED IN A CLOUD-BASED COLLABORATION PLATFORM, filed on Feb. 28, 2014; and U.S. patent application Ser. No. 14/835,606, entitled DATA CACHING IN A COLLABORATIVE FILE SHARING SYSTEM, filed on Aug. 25, 2015, which are hereby incorporated by reference as if set forth in full in this application for all purposes.

BACKGROUND

The present application relates to computing and more specifically to software and associated systems and methods for facilitating software client access to messages generated in a networked computing environment.

Software for facilitating sharing of information via messages in a networked computing environment is employed in various demanding applications, including task scheduling systems for concurrent computing applications, event message sharing and file updating and synchronization activities for collaborative file sharing systems, network analytics software for analyzing and monitoring network characteristics and performance, Quality of Service (QoS) management systems for networked software applications, and so on.

Such applications often demand efficient mechanisms and methods for handling and tracking many messages and associated events occurring in the networked computing environments; preserving and enabling convenient access to and use of messages during server cluster and/or data center problems or outages (e.g., failover mechanisms); enabling delivery of messages to and from disparate computing systems and environments; enabling rapid scalability of data storage and access mechanisms to accommodate growing computing environments, and so on.

Efficient and cost effective mechanisms for sharing information in networked computing environments are particularly important in cloud-based file collaboration systems, including blogs, wikis, social networks, cloud storage accounts, and so on. Such systems may involve, for example, participation of multiple enterprises and thousands of users accessing collaborative workspaces (each of which may pertain to different collaborations) using client devices and accompanying software to exchange potentially millions of messages per day.

Conventionally, such file collaboration systems may use relational databases and accompanying database management systems to collect and selectively distribute messages among collaborators and associated client devices and systems. However, such collaboration databases are often inefficient at allowing access to message content from disparate computing systems and environments and exhibit relatively inefficient scalability. Software developers must often develop custom code to interface with such systems. Such potentially costly custom code development may require detailed knowledge of the databases and associated interfaces.

Alternatively or in addition, message queues, such as Apache Kafka, are employed to collect and selectively disperse copies of messages generated in the computing environments. However, implementing systems to interface with such message queues can be time consuming and costly, as software developers must often code detailed interface mechanisms for handling message flows, tracking client positions in the queues, including message offset management, and so on.

In general, existing systems and methods for enabling software components to access and publish messages to a shared repository or message queue provide relatively ineffective mechanisms for adding new clients, accommodating access by disparate systems, enabling rapid horizontal scalability, and efficiently handling outages of component computing systems.

SUMMARY

An example method facilitates software client access to messages generated via a networked computing environment, such as a cross-enterprise file collaboration system. The example method includes receiving one or more user-initiated events; maintaining an action log table in a particular database, the action log table including a record of the user-initiated events signaled by the client devices; receiving records of other events in addition to the records of events in the action log table; and using a message bus to store the records of the user-initiated events and the other events, the message bus allowing processes executing within the first and second networks to publish and subscribe to the records of the events.

In a more specific embodiment, the method facilitates logging and distribution of event messages in a cross-enterprise file collaboration system that includes one or more servers in communication with one or more client devices (with accompanying client software). The client devices include a first group of client devices on a first network and a second group of client devices on a second network.

The specific example method is performed by the one or more server computers and further includes determining when a number of collected events that are intended for processing by the message bus is greater than a predetermined threshold, and then selectively throttling and/or deferring processing of the collected events. The deferring may be performed in accordance with one or more Quality of Service (QoS) rules.

The particular database may represent a file collaboration event log or repository for collecting data pertaining to events facilitated via a collaboration web application. The message bus may be implemented at least in part using a distributed database.

The message bus may be implemented in part using a message bus service that facilitates client software access to a subscription library. The subscription library (and/or other services) may provide functionality for dispatching event records from the message bus in response to message fetches by client software.

The other events, which are characterized by event messages input to or fetched from the message bus, in addition to event messages pertaining to user-initiated events, include one or more events from server administration software. The one or more events may be described by event metadata maintained in administration logs associated with the server administration software.

Alternatively, or in addition, the other events include one or more events characterized by messages from a message broker (e.g., an Apache Kafka message bus or Action Log Framework (ALF)), where the message broker acts as a second message bus that is a client of the message bus described above. The other events may further include events from analytics software, workflow or task management software, QoS software, and so on.

The specific example method may further include employing a message bus service to generate an abstraction of one or more log files maintained via a distributed database, the abstraction representing the message bus. The message bus service may provide one or more Application Programming Interfaces (APIs) usable by one or more software clients in communication with the message bus via the message bus service.

The one or more APIs may include publish, fetch, and configuration APIs. Additional optional APIs include an API for implementing a client subscription library providing functionality for implementing event message deferral; an offset management API for facilitating management and assignment of message offsets to messages in the message bus, and so on.

The message bus service may expose a message bus abstraction derived from a distributed database wrapped by the message bus service. The message bus service may expose the publish, fetch, and configuration APIs to client software communicating with the message bus service.

Another embodiment provides a non-transitory medium including one or more instructions for execution by one or more processors, the non-transitory medium including instructions for: receiving one or more events; maintaining records of events signaled by client devices; and using a message bus to store the records, the message bus allowing processes to access the records.

Hence, certain embodiments discussed herein enable handling of plural event messages from disparate computing systems and components of a networked computing environment, such as a file collaboration system, including queuing, tracking, and selective throttling of the messages.

Use of the message bus service, as discussed herein, facilitates effective failover and load balancing across server clusters and/or data centers, without dropping or losing messages during the failover process. The message bus service and accompanying methods enable efficient collection of messages, e.g., event messages, from the disparate systems and computing environments and further provide access to the messages at a convenient location in the computing environment for other processes or software clients to publish messages and subscribe to message streams.

The message bus service and accompanying message bus further facilitates horizontal scalability, as the addition of new participating clients may be as simple as assigning the clients a new queue or keyspace partition in the message bus. APIs exposed by the message bus service may further reduce the need for software developers to write substantial overhead code to interface with data provided via the message bus. The APIs may further provide client-position tracking support for monitoring where in a message bus queue a client is reading from or writing to.

A further understanding of the nature and the advantages of particular embodiments disclosed herein may be realized by reference of the remaining portions of the specification and the attached drawings.

DETAILED DESCRIPTION OF EMBODIMENTS

Figure 1:
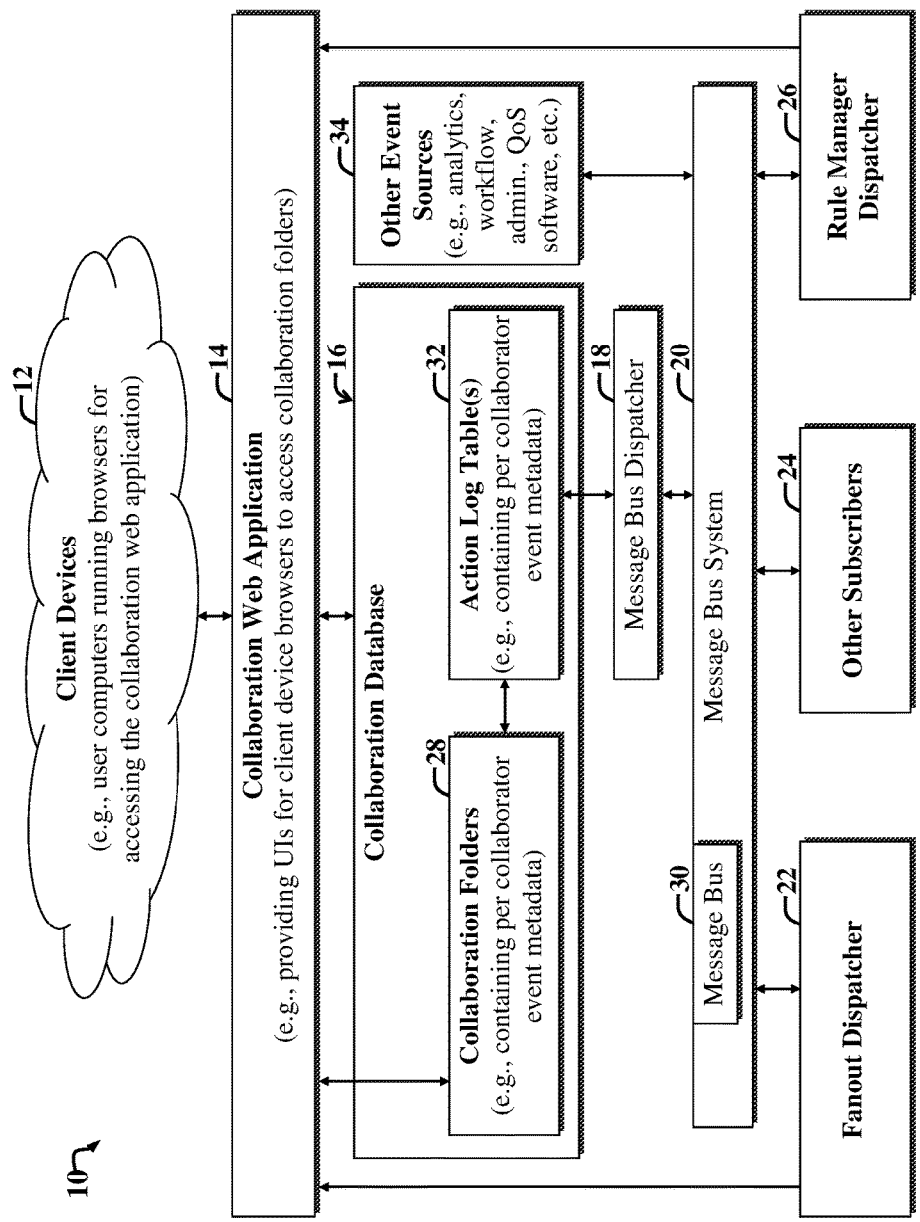
FIG. 1 is a block diagram illustrating a first example system and accompanying enterprise computing environment, which employs a message bus service to expose Application Programming Interfaces (APIs) and associated message bus to client software, including a collaboration database.

In an example file collaboration computing environment, multiple users may collaborate, e.g., by sharing and accessing content via a shared workspace or collaboration folder. Collaborators may have access to certain files of a collaboration folder or shared workspace, in accordance with collaborator permissions to modify or perform other actions pertaining to the files.

File collaboration computing environments can be implemented via one or more clouds accessible to collaborators via client devices (e.g., desktop computers or mobile computing devices) running browsers used to browse to and log into server-based file collaboration software. As a collaboration system expands to host more collaborations and associated collaborators, the need for efficient system scalability, event tracking, and selective sharing of event information grows.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include web services managers, service buses, E-business suites, process managers, notification servers, domain administration software, various types of middleware, including Application Programming Interfaces (APIs), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. However, depending upon the context in which the term "client" is used, a client may be more broadly construed as a computing resource that communicates with another more centralized computing resource (e.g., a resource that is shared by multiple computing resources, processes, or applications), such as a message bus. In such cases, a software application that pushes data to a message bus, e.g., using a publish API of the message bus, may still be called a client of the message bus.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software) may subscribe to and access enterprise software (e.g., Enterprise Resource Planning (ERP) software) by subscribing to a particular suite of cloud services offered via the enterprise software. Various components of the enterprise software may be distributed across resources (e.g., servers) of a network. Note that enterprise software provided by a vendor (e.g., a core enterprise software application) may be deployed to or hosted by a customer cloud, a vendor cloud, and/or a third party cloud, and so on.

Such clouds may include one or more servers, which may be included in one or more data centers. In general, embodiments discussed herein are not limited by a particular deployment location (e.g., data center location) or ownership of a deployment location. Deployment location may be implementation specific and may vary depending upon the needs of a customer, vendor, and/or third party participant and their available computing resources, etc.

For the purposes of the present discussion, a message broker may be any mechanism that collects data (e.g., in the form of one or more messages or streams thereof) from one or more sources in preparation for dispersing collected data or otherwise for making an associated data stream available to one or more other computing devices or components of a computing environment.

Certain concurrent computing applications may employ a message broker, e.g., Apache Kafka (also simply called Kafka herein), to derive a data stream from servers (and accompanying services and software applications) of a cluster, the data of which can be captured and used by various custom processes and applications. For example, conventionally, custom software may be written to extract data from Kafka and to selectively write extracted data to one or more databases.

However, such custom software often involves substantial additional code for coordinating the data extraction and writing process involving plural servers, server clusters, and data centers; for assigning work or sub-processes to different network computing resources; rebalancing work when one or more resources goes offline; tracking offsets of message batches retrieved from Kafka, and so on. Various embodiments discussed herein mitigate certain problems involved with developing and implementing such additional code.

For clarity, certain well-known components, such as hard drives, processors, operating systems, power supplies, Internet Service Providers (ISPs), class loaders, bytecode compliers, job trackers, task trackers, master nodes, slave nodes, coordinators (e.g., Apache Zookeeper), conventional message brokers (e.g., Apache Kafka), and so on, are not necessarily explicitly called out in the figures. However, those skilled in the art with access to the present teachings will know which components to implement and how to implement them to meet the needs of a given implementation.

FIG. 1 is a block diagram illustrating a first example system 10 and accompanying enterprise computing environment, which employs a message bus service as part of a message bus system 20 to expose APIs and an associated message bus 30 to client software 16, 22-26, 34 including a collaboration database 16.

For the purposes of the present discussion, client software of a system, e.g., the message bus system 20 or service, may be any software configured to interact with and use functionality offered by the system, where the interaction may include, but is not limited to, receiving data therefrom and/or publishing data thereto. The client software is said to act as a client to the system if the client software leverages or uses data and/or functionality provided by the system.

Generally, software services provide functionality, e.g., capabilities, that may be reused by different applications or processes (that may be distributed across a network), which access the functionality via a predetermined interface, e.g., as specified via middleware, and consistent with a service description.

Software functionality may be any function, capability, or feature, e.g., stored or arranged data, that is provided via computer code, i.e., software. Generally, software functionality may be accessible via other software, e.g., collaboration web applications, databases, other services, Graphical User Interface (GUI) software and accompanying UI controls and features, and so on. Software functionality (often simply called functionality herein) may include actions, such as retrieving data pertaining to a computing object (e.g., business object); calculating analytics, performing searches, logging sequences of tasks for servers participating in concurrent computing, and so on.

The example system 10 includes client devices 12 in communication with a collaboration web application 14 via a network, such as the Internet. For the purposes of the present discussion, a web application may be any software application or component running on a server, wherein the software application or component is accessible to a client device via a browser and a network.

The client devices 12, which may be any computers that run client software, may include user computers running browsers. Users employing the client devices 12 to access the collaboration web application 14, such as by entering Uniform Resource Locators (URLs) corresponding to the Internet Protocol (IP) address of the collaboration web application 14, are called collaborators. The browsers of the client devices 12 represent client software of the collaboration web application 14.

In general, file collaboration systems, such as that implemented via the system 10, can require the system to keep track of many types of events, e.g., user logins, file uploads, file downloads, adding or removing a collaborator in association with a file, etc. In large systems, many thousands of events may occur each second. An API may be provided so that customers can store and retrieve records of the events.

The collaboration web application 14 includes computer code and associated functionality that enables users of the client devices 12 to participate in collaborations with other collaborators, including collaborators from different enterprises. When a collaboration involves participants from different enterprises or organizations, the collaboration is called a cross-enterprise collaboration.

The collaborations may involve interaction with plural collaborators to manipulate, edit, or otherwise provide information accessible to other collaborators regarding one or more files or other computing objects in one or more folders accessible to the collaborators via the collaboration web application 14. In general, for the purposes of the present discussion, a collaboration may be any collective interaction, occurring simultaneously and/or sequentially, involving two or more collaborators who provide input pertaining to an object being collaborated upon. The object, e.g., computing object, may include one or more files, folders, and/or other collection of information. In practice, participants in a particular collaboration may sign into the collaboration, e.g., by providing username, password, and/or other authentication information associated with permissions to access a particular collaboration.

In the present specific embodiment, the collaboration web application 14 may run on one or more servers as part of an application tier. The web application 14 may store information pertaining to the collaboration, such as files, folders, file change histories, and/or collaboration event information, in a collaboration database 16. The collaboration database 16 may run on one or more servers as part of a first database tier.

The example collaboration database 16 includes collaboration folders 28, which may be edited, modified, augmented with additional files, and so on, via collaborators employing functionality of the collaboration web application 14 via the client devices 12. When a user uploads information, e.g., a file, an edit to a file, and so on, to the collaboration database 16 via the web application 14, the user is said to trigger an event. Similarly, when a file or folder is deleted; when a collaborator stops participating in the collaboration; when a new collaboration joins a collaboration, and so on, an event is triggered.

Information about the event, i.e., event metadata, is stored in an action log table 32 and accessible to user accounts associated with collaborators of a particular collaboration. In the present example embodiment, event metadata that is stored in the action log table 32 is fed to a message bus dispatcher 18, which communicates with a message bus system 20.

The message bus system 20 selectively stores data from the action log table 32 using an underlying distributed database, as discussed more fully below. The message bus system 20 employs one or more APIs to generate the message bus 30, which in the present specific embodiment, represents an abstraction of underlying data. The message bus 30 is exposed to entities communicating with the message bus system 20 using the one or more APIs and/or services that wrap underlying data stored in a distributed database.

For the purposes of the present discussion, a virtual message bus or message bus abstraction may be any software-generated mechanism that presents underlying data to software communicating therewith as a set of one or more queues of data. In the present example embodiment, each queue of data includes event metadata messages (also simply called event messages or events herein) pertaining to events occurring in the collaboration database 16. Furthermore, each queue is arranged or grouped within a heading, called a topic, where each queue under a particular topic represents a topic partition.

A message bus service may be any web service and/or collection of one or more APIs that is adapted to enable client access to data, wherein the data is arranged, from the perspective of a client (i.e., software client), in one or more queues comprising a message bus. A web service may be any software function or operation activated or implemented via software running on a server in response to a signal, e.g., a request message, sent from a client to the server via a network, such as the World Wide Web. The software that implements a web service operation may also be called a web service, software service, or simply service herein.

Generally, web applications may be implemented via various methods and accompanying mechanisms, such as Java, JavaScript, Flash, Silverlight, and so on. Furthermore, certain web applications may be defined by a process template that executes several processes, where each process is implemented via a separate web service.

Generally, software services provide functionality, e.g., capabilities, that may be reused by different applications or processes (that may be distributed across a network), which access the functionality via a predetermined interface, e.g., as specified via middleware, and consistent with a service description.

A message bus may be any queue or register or collection thereof, which may be virtual or not virtual, which is configured to enable writing data thereto, and which automatically discards certain messages after a certain number of messages are written to the message bus and/or after a predetermined time interval. A message bus is said to be a virtual message bus if it exposes functionality that acts like a message bus to one or more services or processes accessing (e.g., writing to or retrieving data from) the message bus, but which selectively retrieves or deposits message data in accordance with client requests to and from an underlying database.

The message bus dispatcher 18 includes computer code for selectively distributing data obtained from the action log table 32 (also called the event firehose) to particular topics and partitions of the message bus 30. Users, e.g., collaborators, of the collaboration web application 14 may subscribe to different topics and partitions of the message bus 30. The associated client software applications used by the client devices 12 are said to be subscribed to a queue or bus of the message bus system 20. Subscriptions may be implemented via software running on the collaboration database 16 in communication with a subscription API or service of the message bus system 20.

In the present example embodiment, a fanout dispatcher 22 communicates with the message bus system 20 and the collaboration web application 14. The fanout dispatcher 22 is configured to enable dispersal of event messages from the message bus system 20 to appropriate user accounts of the collaboration web application 14. Such subscriptions are particularly useful for enabling collaborators using the client devices 12 to synchronize their accounts (and the associated folders and files associated with a given user collaboration) of the collaboration web application 14 with other collaborators participating in a given collaboration. For example, if one collaborator uploads a file, other collaborator accounts are synchronized to show the additional uploaded file. This synchronization is implemented in part by event messaging accessible to the collaboration web application 14 via the message bus system 20 and the associated fanout dispatcher 22.

The example rule manager dispatcher 26 uses fetch messaging, e.g., uses a fetch API of the message bus system 20, to subscribe to and obtain messages other than event messages, e.g., messages identifying rules, stored in the message bus 30. For example, a particular topic and partition of the message bus 30 may be employed to store messages representing rules (or messages that otherwise trigger generation of a software task based on a rule in response to receipt of a particular message by the rule manager dispatcher 226) to be followed and/or otherwise implemented via other software, e.g., the collaboration web application 14, in communication with the rule manager dispatcher 26.

The rule manager dispatcher 26 includes computer code for selectively distributing rules (and/or tasks based on the rules) to client accounts or other software entities or objects configured to interface with and receive rules or instructions from the rule manager dispatcher 26. Hence, the message bus system 20 and associated message bus 30 may store information other than event messages.

Other subscribers 24 may also subscribe to and/or otherwise interact with the message bus system 20 and associated message bus 30. The other subscribers 24 may include, for example databases, other message busses and message brokers (e.g., Apache Kafka), task schedulers, and so on. For example, in certain embodiments, a task scheduler may write, i.e., commit, a series of tasks or instructions to one or more topics and/or partitions of the message bus 30. Other servers that run services for interfacing with the message bus system 20 may then subscribe to and read messages identifying tasks from a particular subscribed-to queue of the message bus 30, and then selectively perform the tasks in accordance with a concurrent computing framework or architecture.

Note that in practice, the message bus system 20 and associated message bus 30 may be implemented via plural servers that may be distributed across one or more server clusters and/or one or more data centers and may include several subsystems or components and plural message busses or components, including replicated versions thereof, as discussed more fully below.

Furthermore, note that while the fanout dispatcher 22 and rule manager dispatcher 26 are shown communicating with a collaboration web application 14 on an application tier, that embodiments are not limited thereto. For example, other web applications, services, or other computing resources may consume messages from the message bus system 20; selectively process and/or write the messages to various types of targets, not limited to a collaboration web application 14.

In the present example embodiment, use of the message bus system 20 to handle messages from the action log table 32 of a collaboration database 16 used for a collaboration web application may reduce computing load on the first database tier hosting the collaboration database 16. Furthermore, one or more APIs employed by the message bus system 20 may facilitate adding new queues to the message bus 30, thereby facilitating horizontal scalability.

Other event sources 34, such as analytics, workflow, Quality of Service (QoS) software or services, and so on, may write, i.e., commit, event messages or other types of messages to the message bus 30 via the message bus system 20 and accompanying APIs. Other subscribers 24 may employ message bus system APIs to subscribe to different message queues of the message bus 30 as needed to obtain information from the message bus 30 queues for a particular software activity, e.g., analytics computations, software task or workflow implementations, and so on.

In certain implementations, the number of messages maintained in a message bus queue for a given time interval may be relatively short, and the number of queues may be relatively large. Each time a new topic and/or partition is/are added to the message bus 30 for a new collaborator account of the collaboration web application, the message bus 30 widens (to include additional message bus queues). The exact lengths or durations of persistence of messages in a queue of the message bus 30 are implementation specific and may vary, without departing from the scope of the present teachings.

Note that while the example system 10 facilitates implementing a file collaboration system, the message bus system 20 is not limited to use with file collaboration systems. For example, the collaboration web application 14 and associated collaboration database 16 may be omitted from the system 10, without departing from the scope of the present teachings.

In the present example embodiment, the collaboration web application 14 and accompanying collaboration database 16 act as clients of the message bus system 20, to the extent that they use the temporary event message storage capabilities and features thereof. Similarly, the fanout dispatcher 22, other subscribers 20, the rule manager dispatcher 26, and other event sources 34 can also represent clients of the message bus system 20, as the term "client" is used herein.

In general, the example system 10 illustrates a general architecture of an event messaging system using a message bus 30. An example of a messaging system that includes components and features that can be adapted for use with the message bus architecture of system 10 is described in the above-identified U.S. patent application, entitled SCALABILITY IMPROVEMENT IN A SYSTEM WHICH INCREMENTALLY UPDATES CLIENTS WITH EVENTS THAT OCCURRED IN A CLOUD-BASED COLLABORATION PLATFORM. Note that the aspects and functionality described herein may be adapted for different types of messaging systems. Furthermore, the particular architecture of the system 10 is merely a broad illustration. Embodiments can be different from the architecture shown in FIG. 1.

In the present example embodiment, the message bus system 20 may provide additional APIs, e.g., an API to allow developers or customers to create their own software that can access and interact with the message bus 30. Additional APIs facilitate publishing of, subscribing to, and obtaining information (e.g., configuration information) about messages or records maintained via the message bus 30 and associated underlying database, as discussed more fully below.

Provisions are made for mirroring message bus records and other data in case of a failover or general failure of the system. One embodiment allows the message bus system 20 to allow clients to perform "event deferral," i.e. to allow clients to defer processing certain events so as not to overload the message bus system 20. Alternatively, or in addition, the message bus system 20 may automatically implement event deferral based on one or more criteria such as a quality of service (QoS) factor or rating.

Note that conventionally, file collaboration systems employ separate event and administration logs in a collaboration database. Use of embodiments in accordance with the system 10 facilitate maintaining such log data temporarily as messages in queues of the message bus 30 of the message bus system 20. Such use of message bus queues maintained in memory (e.g., Random Access Memory (RAM)) enables more rapid and efficient addition of new collaborators and client software subscribers and may greatly enhance overall system performance.

Conventionally, in the absence of message bus topic fetch and append abstractions (implemented via one or more APIs and/or associated services of the message bus system 20), each client of a queue required detailed knowledge of queue layouts in an underlying distributed database (e.g., Apache HBase) to enable implementation of proper queue semantics on top of lower level storage APIs of the underlying distributed database. Furthermore, such distributed databases often lacked efficient native replication support (e.g., to replicate data to other systems for redundancy in case of the failure of a given system), thereby requiring that each client that writes to a particular topic also manually replicate the data to other distributed database clusters. Such conventional approach was relatively inefficient.

Note that the message bus system 20 may be implemented in part as an additional layer on top of such a distributed database, whereby the layer provides efficient message access, publishing, and so on, as discussed herein. The message bus system 20 includes built-in replication support, as discussed more fully below, for facilitating implementing server cluster and/or data center failover if one or more server clusters goes offline or otherwise becomes inoperable, overloaded, or otherwise begins performing poorly.

Note that in certain implementations, the action log table 32 may feed or may otherwise be accommodated by an underlying distributed database (e.g., using MySQL or Apache HBase). The message bus dispatcher 18 may then dispatch messages from the underlying distributed database to the message bus system 20 for use in the message bus 30, which is accessible to other network components, e.g., components 22-26, 34. Alternatively, the collaboration database 16 is a front-end database, and another distributed database is included within the message bus system 20, which provides the message bus 30 as an abstraction of data stored in the underlying distributed database.

Hence, embodiments are not limited to use of the message bus system 20 as a wrapper on an underlying distributed database that provides data to be presented by the message bus system 20, but, alternatively, or in addition, the underlying distributed database may feed the message bus system 30 as new messages arrive into the underlying distributed database via other channels.

Note that in certain embodiments, the collaboration database 16 and accompanying components 28, 32 may be implemented via a framework (e.g., Action Log Framework (ALF)) that holds transactional logs of messages (e.g., via the action log table 32) for all collaborator-initiated events in the system 10. For the purposes of the present discussion, events that involve modification of data (e.g., collaboration data) in a database are called transactional events. Examples of transactional events include uploading of a file to a collaboration folder, moving a file to a different subfolder, deleting one or more files, and so on. Events that do not involve modification of data in a database, e.g., a collaborator logging into a collaboration, are called administrative events herein.

The action log table 32 may provide a data stream that feeds downstream components, e.g., public events services or APIs, updates pages, and so on. The data stream, which is now accessible to system components, e.g., services, APIs, and so on, via the message bus 30, provides, in part, a source for user event-based internal services accessible to the client devices 12 via the collaboration web application 14.

Use of the message bus system 20 overcomes various performance problems and limitations of conventional systems, which were caused in part by excessively tight integration of the action log table 32 to the main application database tier. Although the tight integration aimed to help guarantee that events logged into the action log table 32 were transactionally consistent with the database modifications (e.g., modifications to the collaboration folders 28) associated with a particular collaborator log, this increased storage and load requirements associated with adding new subscribers or event messages to the action log tables 30. The storage and load requirements were largely born directly by the main application database tier (corresponding to the collaboration database 16). Use of the message bus system 20 substantially alleviates such burdens and may enable data that would otherwise have been written to the action log table 32 to be written directly to the message bus system 20.

Furthermore, note that in certain implementations, the action log table 32 may be omitted and instead implemented directly in the message bus system 20, without departing from the scope of the present teachings.

Conventionally, different systems may be required to publish messages to different types of logs accessible to other systems. For example, an administration system may publish or log event data in an administration log, and other software generating network events may publish data to an event log. However, in certain cases, a software system may require data from the administration log and the event log or other log, and how and/or where to access additional potentially useful data (to the software system) may be initially unknown and require extensive custom software research and development. This may inhibit communications and message flows and may complicate software system development, failover procedures, and so on.

Use of the system 10 and accompanying message bus system 20 and accompanying APIs overcomes these problems in party by providing efficient mechanisms for enabling client software to subscribe to, publish to, and obtain information about messages in the message bus 30. Note that client read and/or write positions in a given queue of the message bus 30 are efficiently handled via APIs, as discussed more fully below. Those skilled in the art with access to the present teachings may readily implement such APIs as needed for a particular system implementation, without undue experimentation.

Figure 2:
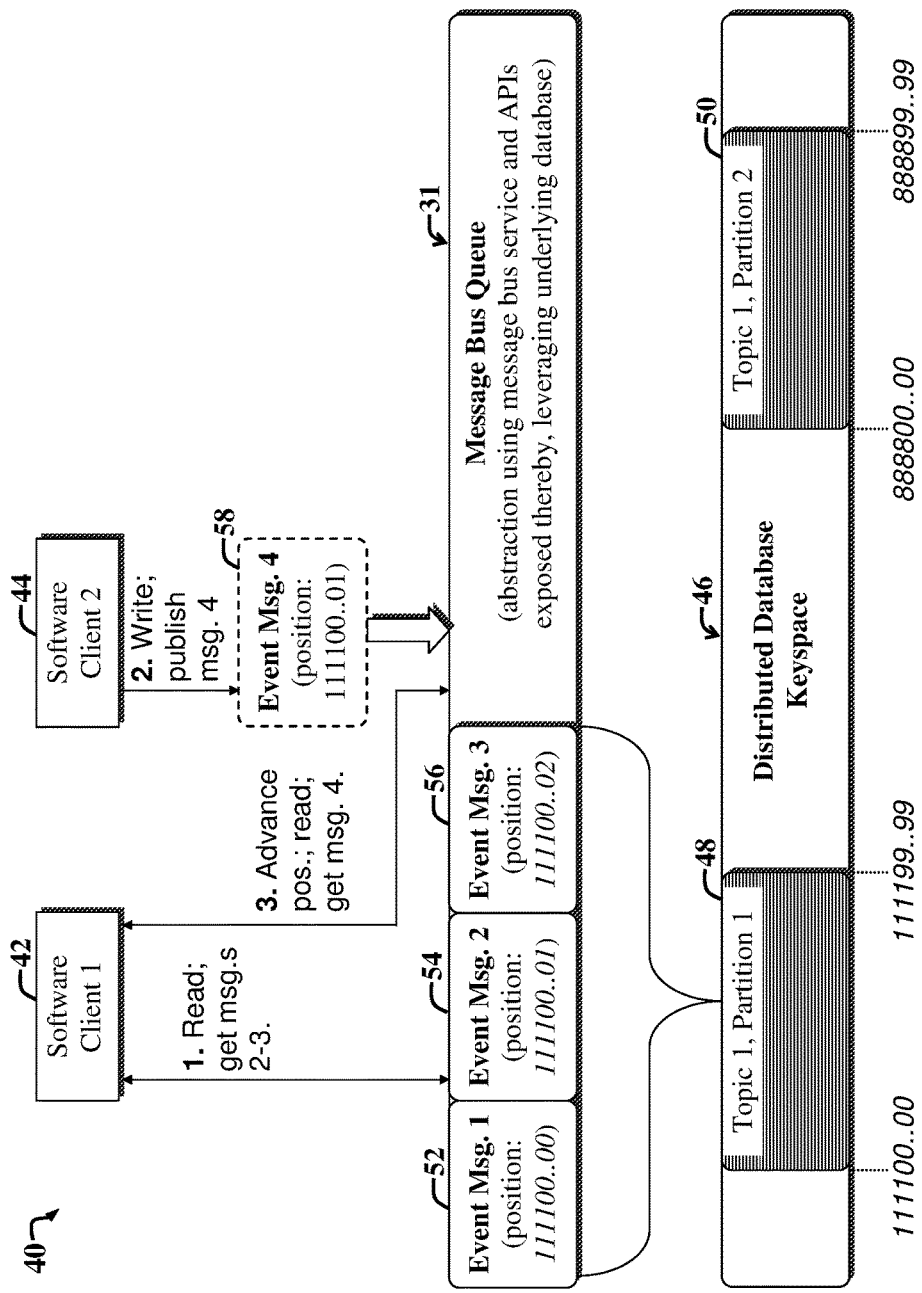
FIG. 2 illustrates additional detail of an example message bus accessible to one or more client software applications in the networked computing environment of FIG. 1.

FIG. 2 illustrates an example client-message bus interaction 40 showing additional detail of an example message bus queue 31 accessible to one or more client software applications 42, 44 in the networked computing environment 10 of FIG. 1.

With reference to FIGS. 1 and 2, in the present example scenario, the message bus queue 31 represents a particular topic and partition of the message bus 30 of FIG. 1 to which a first client 42 and a second client 44 are subscribed. The message bus queue 31 is exposed to the clients 42, 44 via one or more services and/or APIs that wrap or encapsulate data 48 maintained in accordance with an underlying distributed database keyspace 46.

For the purposes of the present discussion, a service is said to expose an API if it provides an interface usable by entities communicating with the service, wherein the interface provides functionality defined by the API for accessing data and/or functionality associated with the service. A message bus service or API (or collection of services and/or APIs) is said to wrap a database if it adds additional functionality (not provided by the database) and/or presents different functionality to clients interacting with the database, or otherwise selectively controls the database and presentation of functionality thereof to software (e.g., clients) interacting therewith. The database is said to be an underlying database to the message bus service, API, and/or associated system.

For illustrative purposes, an example distributed database keyspace 46 is shown including an additional topic and partition 50, which may be used by the message bus system 20 of FIG. 1 to generate another queue of the message bus 30 to which clients may subscribe and/or otherwise interact with (e.g., reading from, writing to, etc.).

For the purposes of the present discussion a database keyspace may be any computing object that includes families or groups (also called topics herein) of columns and/or rows (also called partitions herein) of data. A computing object may be any collection of data and/or functionality.

The example message bus queue 31 represents a portion of the distributed database keyspace 46, but with added message bus queue functionality. The message bus queue functionality includes message offset specification and control, queue length specification and control (e.g., number of messages held in a queue before the oldest messages are discarded from the queue), and so on. Such message bus queue functionality may be provided via one or more APIs, as discussed more fully below.

In the example scenario 40, initially three event messages 52-56 have been written to the message bus queue 31 via one or more clients (e.g., the first client 42) employing a publish API of the message bus system 20 of FIG. 1.

A first event message 52 is assigned an example two-part position (e.g., message offset value) of 111100 . . . 00 corresponding to a start key for a first topic and first partition 48 of the underlying database keyspace 46. Similarly, a second event message 54 has a position number that is incremented by one relative to the position number of the first event message 52; a third event message 56 has a position number that is incremented by one relative to the position number of the second event message 54, and so on.

The event messages 52-58 may contain information pertaining to, for example, a file upload, a file download, a comment creation process (e.g., creation of a comment associated with a file that is part of a file collaboration), removal of a collaborator from a collaboration, and so on. The example message bus queue 31 may represent a per-user queue, i.e., a queue assigned to or otherwise associated with a particular collaborator of the file collaboration web application 14 of FIG. 1.

In the present example scenario, the first client 42 is shown initially reading from a second queue position (corresponding to the position of the second event message 54). A fetch API of the associated message bus system 20 of FIG. 1 is used by the first client 42 to read from the second queue position and then fetch, i.e., obtain copies of all event messages in the message bus queue 31 occurring on and after the read position. Hence the first client 42 receives copies of the second event message 54 and the third event message 56, which represent messages currently in the message bus queue 31 occurring on and after the read position corresponding to the position of the second event message 54.

After performing a read and associated fetch of the second event message 54 and the third event message 56, the read position of the software client 42 is advanced to a read position after the last retrieved message, i.e., after the position of the third event message 56. This advancement of the read position is facilitated by the fetch API of the message bus system 20 of FIG. 1, as discussed more fully below.

In the present example scenario, while the first client 42 is fetching messages from the message bus queue 31 after its read position in the queue 31, a second client 44 employs a publish API of the message bus system 20 of FIG. 1 to write to, i.e., publish to the message bus queue 31. The second client 44 is showing writing a fourth event message 58 to the queue position after the position of the third event message 56.

After the fourth event message 58 is written to the message bus queue 31, and the first client 42 advances its read position and initiates a fetch, the resulting fetch will return the fourth event message 58 to the first client 42. The read position of the first client 42 is then advanced to the fifth position in the message bus queue 31.

Note that message bus system assignments of queue position numbers to event messages are implementation specific, and may vary depending upon the needs of a given implementation. However, use of certain queue position number assignment methodologies, as discussed more fully below, may enhance data center failover processes.

Figure 3:
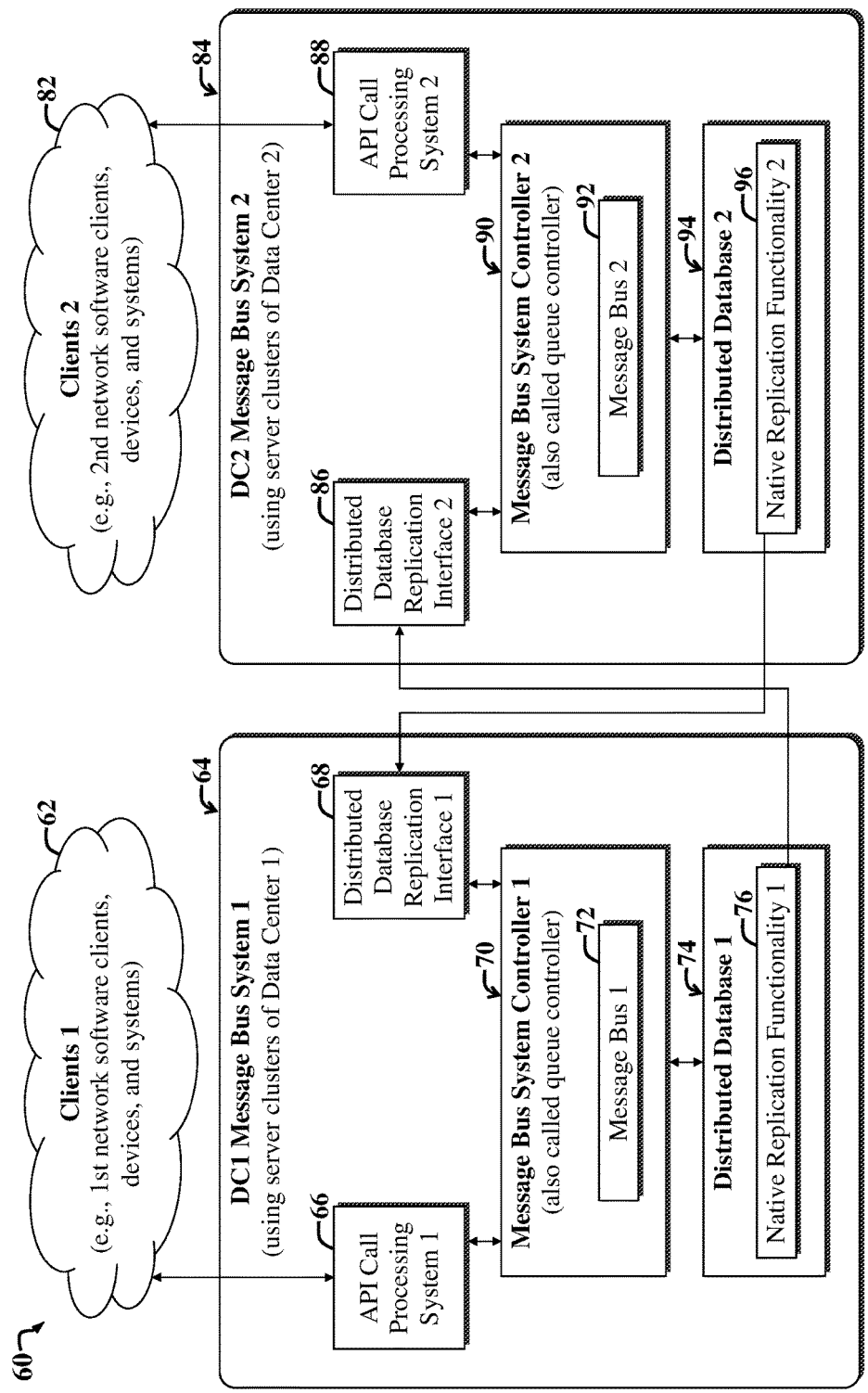
FIG. 3 is a block diagram of a second example system, illustrating event message replication between data centers and/or server clusters to facilitate data efficient center failover.

FIG. 3 is a block diagram of a second example system 60, illustrating mechanisms for event message replication between data centers 64, 84 and/or server clusters to facilitate data efficient center failover. The second example system 60 includes a first set of software clients 62 in communication with a first network represented by a first data center message bus system 64, and a second set of software clients 82 in communication with a second network represented by a second data center message bus system 84.

The message bus systems 64, 84, which run on separate data centers and/or server clusters. For the purposes of the present discussion, a server cluster may be any collection of one or more servers. A data center may be any building or facility housing or accommodating a collection of computing resources, e.g., servers.

The first Data Center (DC1) message bus system 64 includes a first API call processing system 66 that interfaces the first set of software clients 62 with a first message bus system controller 70 to facilitate presentation of a first message bus 72 to the first set of clients 62. The first message bus 72 represents an abstraction of data maintained via a first underlying distributed database 74. The abstraction is presented to clients as exhibiting message bus features, e.g., queues with messages with position numbers and/or other offset values. Presentation of the abstraction is facilitated by one or more APIs used by the API call processing system 66.

The first underlying distributed database 74 (e.g., as may be implemented via Apache HBase, MySQL, Kafka, and/or other mechanisms) of the first message bus system 64 includes a first instance of native replication functionality 76. For the purposes of the present discussion, native replication functionality of a distributed database may be any functionality that is built into the distributed database. Replication functionality may be any computing resources, e.g., computer code and associated functionality, that are configured to facilitate copying data from a first computing resource or location to a second computing resource or location, e.g., first server, server cluster, data center, or other storage mechanism or location to a second server, server cluster, data center, or other storage mechanism or location.

The first message bus system 64 further includes a distributed database replication interface 68, which may be implemented via one or more message bus replication APIs and/or services. Note that while the first replication interface 68 is illustrated separately from the first API call processing system 66, the first distributed database replication interface 68 may be considered as part of the first API call processing system 66, without departing from the scope of the present teachings.

The construction and operation of the first message bus system 64 and the first set of clients 62 are similar to the construction and operation of the second message bus system 84 and second set of clients 82, with the exception that, in certain implementations, the first message bus system 64 may operate in slave or master mode, while the second message bus system 84 may operate in master or slave mode, respectively.

In other implementations, the first message bus system 64 and the second message bus system 84 replicate to each other as though both are acting as master and slave systems simultaneously. In such implementation, when one of the message bus systems 64, 84 and/or associated data centers experiences operational issues, e.g., one data center goes offline or is otherwise compromised, operations of the affected message bus system may be transferred to the non-effected message bus system 84, 64.

The second message bus system 84 includes a second distributed database replication interface 86, a second API call processing system 88, a second message bus system controller 90, a second message bus 92, and a second distributed database 94 with a second instance of native replication functionality 96, which may be constructed similarly to the corresponding modules 66-76 of the first message bus system 64.

In the present example embodiment, the first message bus system 64 leverages the first instance of native replication functionality 76 to replicate message bus data to the second message bus system 84 via the second distributed database replication interface 86. Similarly, the second message bus system 84 selectively leverages the second instance of native replication functionality 96 to replicate message bus data (associated with the second message bus 92) to the first message bus system 64 using the first distributed database replication interface 68.

Note that in certain implementations, certain clients may write data directly to the distributed databases 74, 94, without using fetch and publish APIs provided by the call processing systems 66, 88. In such implementations, the message bus system controllers 70, 90, may still present data written to certain predetermined portions of the keyspaces of the distributed databases 70, 90 to certain clients subscribing to messages busses associated with those keyspaces, without departing from the scope of the present teachings.

Hence, message bus systems that only offer a fetch API or a publish API to a particular client may be employed, without departing from the scope of the present teachings. All clients need not have access to or use all APIs of the call processing systems 66, 88 in all implementations.

Figure 4:
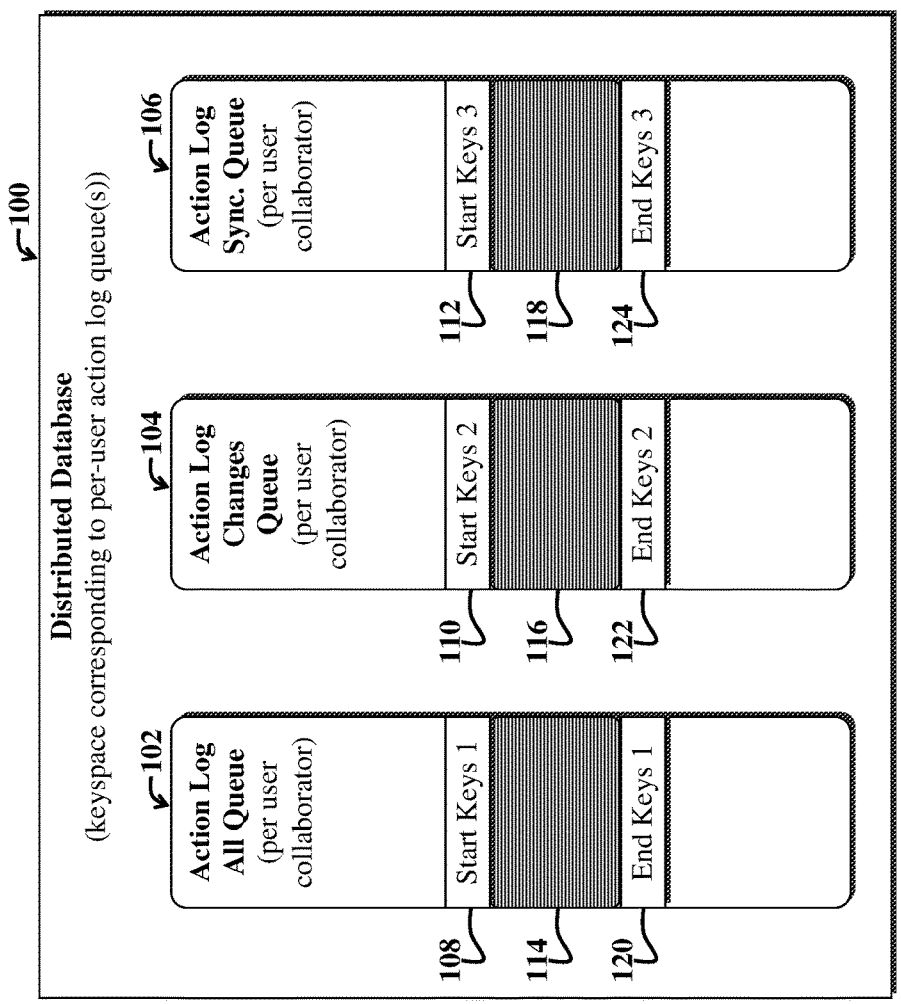
FIG. 4 illustrates additional detail of example tables in a distributed database that may be leveraged via the message bus systems of FIGS. 1 and 3 to expose a message bus to client software via one or more APIs.

FIG. 4 illustrates additional detail of example tables in a distributed database 100 that may be leveraged via the message bus systems of FIGS. 1 and 3 to expose a message bus to client software via one or more APIs.

With reference to FIGS. 1 and 4, in the present example embodiment, the distributed database 100 includes various example tables 102-106, representing portions of a keyspace of the distributed database 100. The tables 102-106, also called action log tables or queues, maintain event message data, i.e., data pertaining to events occurring via the collaboration web application 14 of FIG. 1 in response to collaborator-triggered events, e.g., file uploads, file deletions, edits, comments, and so on.

Note that the action log queues 102-106 may represent a portion of a keyspace of a distributed database 100 that may be integrated within or wrapped by the message bus system 20 of FIG. 1. The queues 100 may be populated, in part, via data from the action log tables 32 of the collaboration database 16 of FIG. 1.

The example tables 102-106 include a first action log queue 102, also called the "all" queue, as it maintains a collection of all event messages not included in the other tables 104, 106. The other tables 104, 106 include a second action log table 104, also called the "changes" queue, as the table 104 maintains event messages corresponding to changes made to a particular file collaboration, e.g., changes made to a particular folder used for a particular collaboration. A third table 106 represents a synchronization queue.

The tables 102-106 represent per-user queues, as each collaborator (i.e., associated collaborator user account) using the collaboration web application 14 of FIG. 1 will have a separate set of tables 102-106, which may act like queues that store event message data pertaining to each collaborator.

Each of the tables 102-106 include start keys 108-112 and end keys 120-124 surrounding portions 114-118 of the tables 102-104 representing event messages to be presented as message bus queues to client software subscribed to the message busses 102-106.

Note that in certain implementations, the distributed database 100 and associated action log tables 102-106 represent the underlying distributed database that is wrapped by a message bus system 30 of FIG. 1 (e.g., using one or more message bus services and/or APIs) and presented to other software clients for use in fetching data from, publishing data to, and so on. In other alternative implementations, the distributed database 100 may be used as a front-end or middle tier collaboration database, and a message bus can be used to wrap such collaboration database.

In general, embodiments are not limited to use of a single message bus system. For example, one message bus system may be used to feed another message bus system, and so on, without departing from the scope of the present teachings. Furthermore, other queuing systems, e.g., Apache Kafka, may feed data to message bus systems constructed in accordance with the present teachings, without departing from the scope thereof.

Hence, in one implementation, a collaboration database feeds a message bus system with data from an action log table, where the message bus system wraps a separate distributed database used to maintain data fed to the message bus system. In another implementation, the wrapped distributed database contains the action log tables, which have been populated directly via a collaboration web application, wherein the collaboration database is implemented via the distributed database that is wrapped by the message bus system.

In general, message bus systems discussed herein (and accompanying underlying distributed databases employed thereby), represent clean publish/subscribe message bus systems that are transparently distributed among multiple servers, server clusters, and/or data centers. For the purposes of the present discussion, a keyspace, service, API, system, and/or other network resource or process that is replicated and/or otherwise included among multiple servers is said to be transparently distributed among the servers or nodes if clients interacting with the keyspace, service, or other network resource or process, and so on, interact with the multiple servers as though the multiple servers were a single server.

Figure 5:
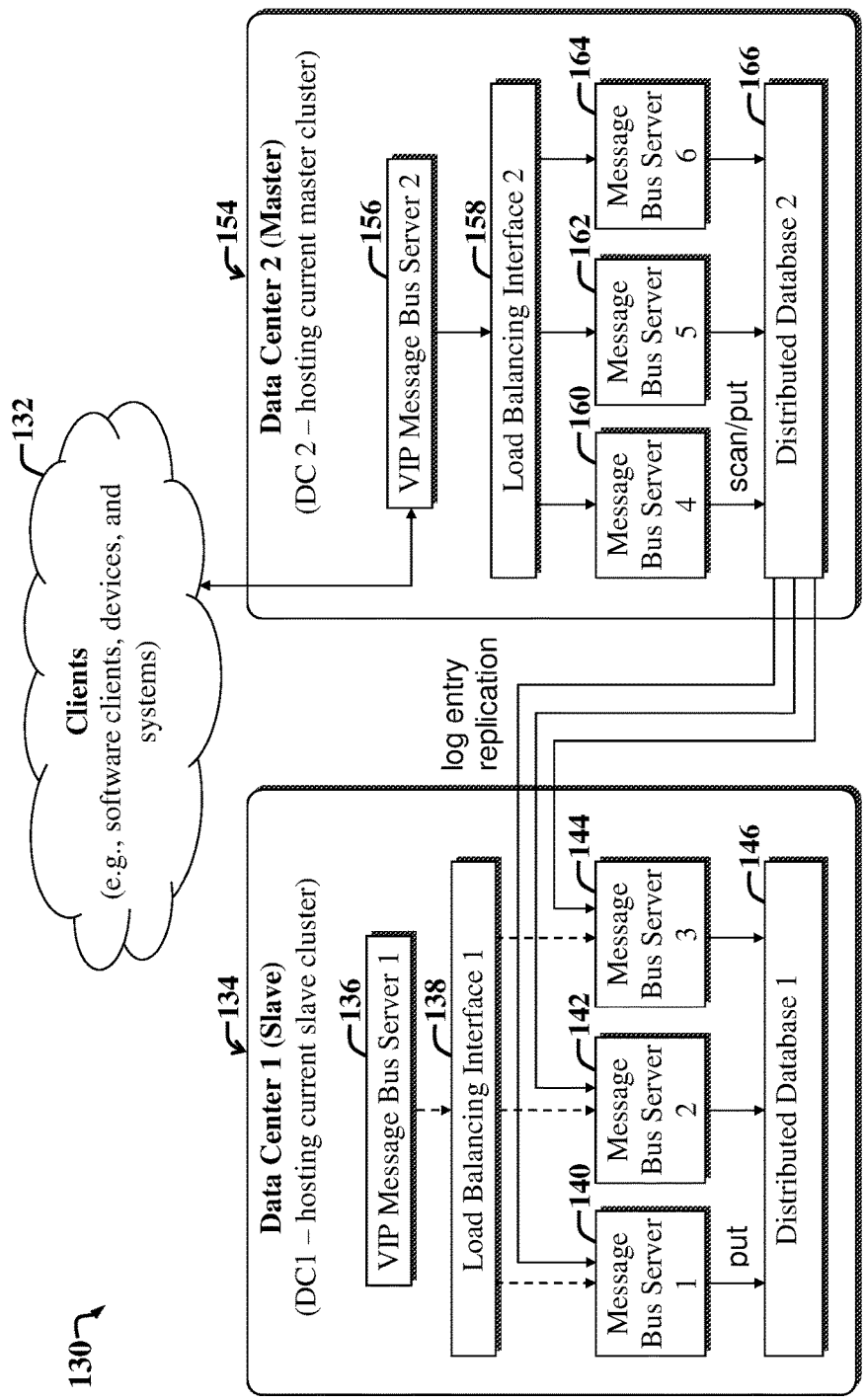
FIG. 5 illustrates additional detail of an implementation of the example system of FIG. 3, which includes use of plural distributed message bus servers in communication with a load balancer.

FIG. 5 illustrates additional detail of an implementation 130 of the example system 60 of FIG. 3, which includes use of plural distributed message bus servers 140-144, 160-164, in communication with load balancers 138, 158. In the example message bus system implementation 130, clients 132 communicate with a second data center 154, which acts as a master to a first data center 134, which acts as a slave to the second data center 154 in one operational mode.

When the second data center 154 is operating in a master mode, the clients 132 are interacting with (e.g., fetching data from, writing data to, etc.) a message bus system implemented via a second lead (also called VIP) message bus server 156, a second load balancing interface 158, master message bus servers 160-164, and a second underlying distributed database 166. Concurrently, the first data center 134 acts as a slave data center, i.e., a backup data center in the event that a data center failover is required.

In the present example embodiment, the second VIP message bus server 156 runs message bus APIs and/or services that facilitate presenting a message bus to the clients 132. The second VIP message bus server 156 may act as a parent to distributed child message bus servers 160-164. The VIP message bus server 156 employs the second load balancing interface 158 (e.g., a bonded pair of HAProxy servers) to facilitate directing message bus traffic to/from the child message bus servers 160-164, which may publish or write data (e.g., data and message offsets of event messages of a file collaboration system) to and fetch or retrieve data from tables of a database keyspace of the second distributed database 166. The tables or portions thereof of the second distributed database 166 may correspond to message bus queues in a message bus exposed to the clients 132.

The slave data center 134 includes components 136-146, which are constructed similarly to the respective components 156-166 of the second data center 154, thereby enabling efficient switch-over or failover if the second data center 154 begins to go offline or otherwise requires a handoff of functions to the slave data center 134. After a failover, the first data center 134 becomes the master, and the second data center 154 becomes the slave, and the clients 132 begin communicating with the first data center 134.

In the present example embodiment, data from the second distributed database 166 is replicated to a first distributed database 146 of the first data center 134 using native replication functionality of the second distributed database 166 and one or more message bus APIs running on distributed child message bus servers 140-144 of the first data center 134. Upon data center failover, and a corresponding mode switch, i.e., a switch of the slave mode of the first data center 134 to a master mode and a switch of the master mode of the second data center 154 to slave mode, data from a first distributed database 146 of the first data center 134 begins replicating to the second distributed database 166.

The child message bus servers 140-144 act as children of the first VIP message bus server 136, which may use a first load balancing interface 138 (e.g., a bonded pair of HAProxy servers) to direct message traffic to/from clients and to/from the child message bus servers 140-144 when the first data center 134 is operating in a master mode.

Note that the distributed databases 146, 166 may include plural distributed database servers. The child message bus servers 140-144 of the first data center 134 are configured as replication targets for distributed database servers of the second distributed database 166 of the second data center 154, when the second data center 154 operates in a master mode, and the first data center 134 operates in a slave mode, as discussed more fully below with reference to FIG. 6.

Figure 6:
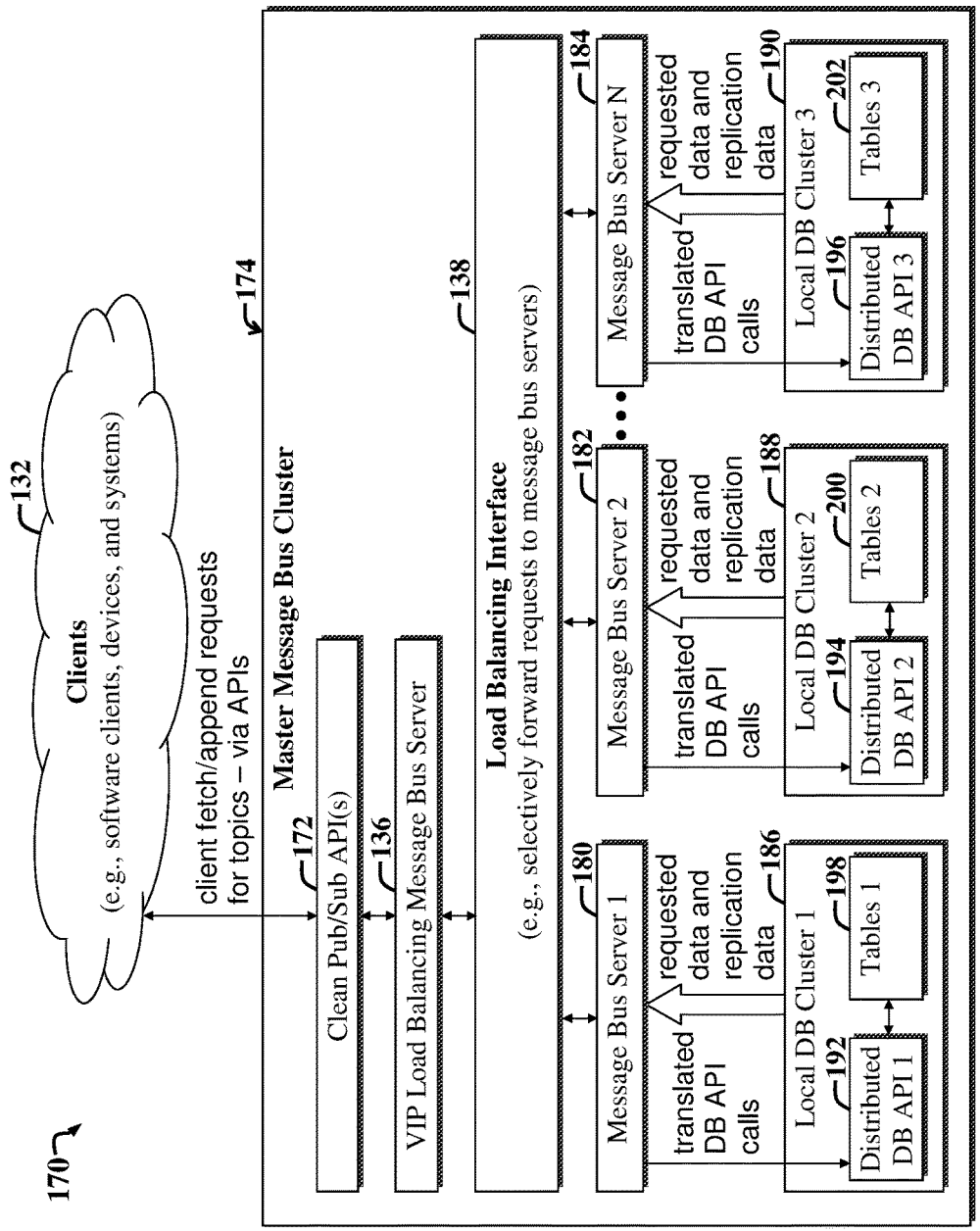
FIG. 6 illustrates additional detail of an example message bus cluster usable with the embodiments of FIGS. 1-5 and further illustrating slave message bus servers configured as replication targets for an underlying distributed database.

FIG. 6 illustrates additional detail of an example computing environment 170 and accompanying message bus server cluster 174 usable with the embodiments of FIGS. 1-5, and further illustrating child message bus servers 180-184 (which may be considered children of a VIP load balancing message bus server 136) configured as replication targets for clusters 186-190 of an underlying distributed database.

The example message bus server cluster 174 (also simply called message bus cluster) includes a publish/subscribe API 172, which may represent a collection of one or more APIs and/or services. The publish/subscribe API 172 interfaces communications of client software of clients 132 with a VIP load balancing message bus server 136. The VIP load balancing message bus server 136 employs a load balancing interface 138 (e.g., as may be implemented via HAProxy servers and software) to facilitate distributing messaging load between child message bus servers 180-184.

An underlying distributed database, represented by local database clusters 186-190, incorporates distributed database APIs 192-196 to facilitate interfacing communications between the child message bus servers 180-184 and tables 198-202 of the different local distributed database clusters 186-190. In general, the child message bus servers 180-184 act as replication targets for the local database clusters 186, which may then transfer the replicated data to distributed database servers of a backup or slave server cluster and/or data center.

The transfer or replication of data used by a message bus system to another data center, without dropping messages, may be implemented in accordance with a set of message bus replication functionality that is adapted to sense when messages may have been dropped during a failover and then resending or otherwise transferring dropped messages to the slave data center and associated message bus system that is receiving replicated data. The sensing may be facilitated via various mechanisms, including tracking of an epoch identifier or number that increments after each master-slave data center switch and indicates a current master-slave configuration mode, and mechanisms for implementing strategic message offsets for each message, as discussed more fully below.

Figure 7:
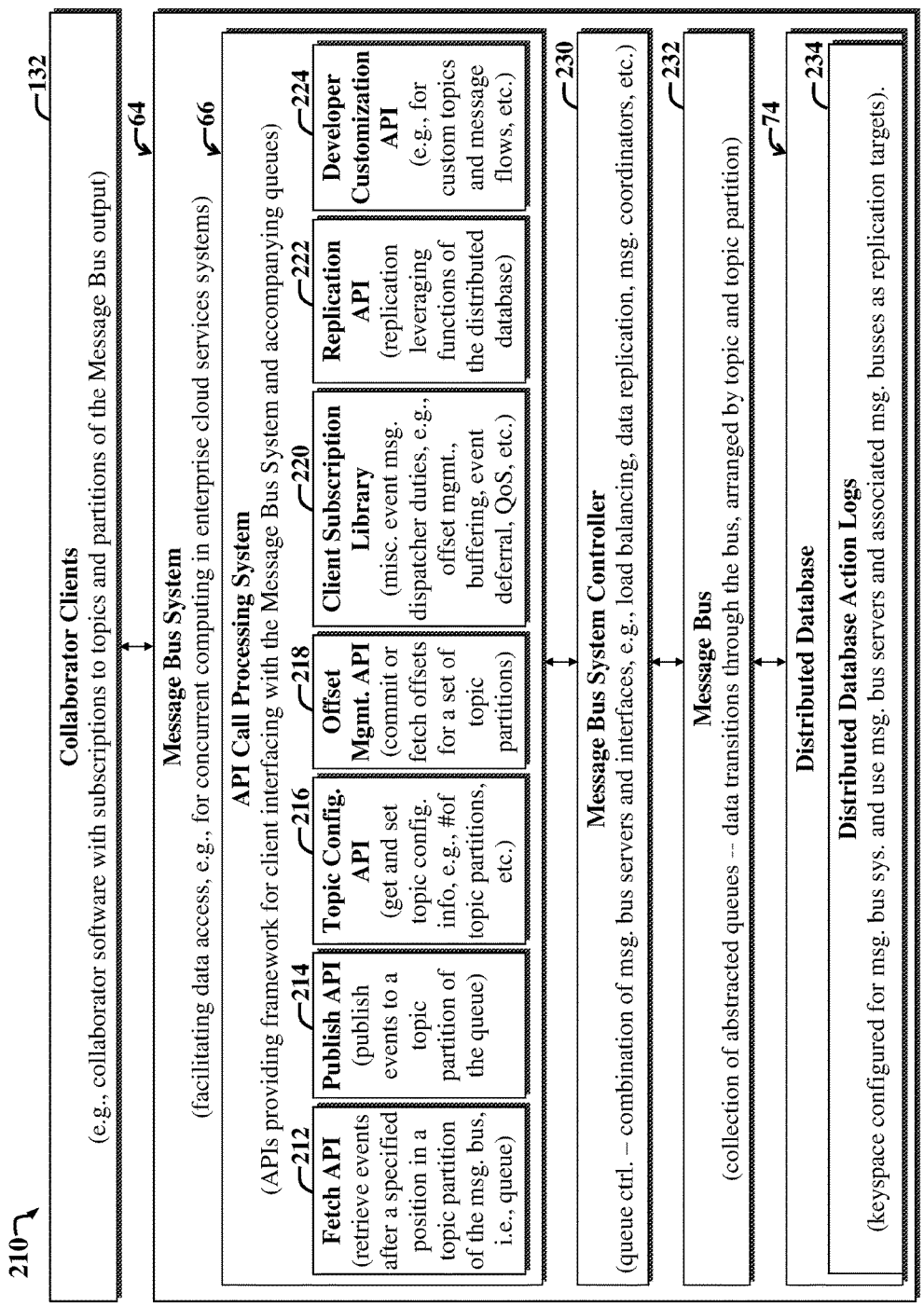
FIG. 7 is a more detailed block diagram illustrating various APIs usable with the embodiments of FIGS. 1-6.

FIG. 7 is a more detailed block diagram of an example system 210 illustrating various APIs 212-224 usable with the embodiments of FIGS. 1-6. In the present example embodiment, software clients 132 use a message bus system 64 to selectively interact (e.g., subscribe to, fetch data from, publish data to, etc.) with data, e.g., distributed database action logs 234 of a distributed database 74, which is wrapped by the message bus system 64 via the APIs 212-224.

Note that other modules, e.g., a collaboration web application, may form part of the system 210, without departing from the scope of the present teachings. For clarity, such modules are omitted from FIG. 7, or otherwise considered to be incorporated into the collaborator clients 132.

The example services and/or APIs 212-224 used by the API call processing system 66 include a fetch API 212, a publish API 214, a topic configuration API 216, an offset management API 218, a client subscription library 220, a replication API 222, and a developer customization API 224.

The fetch API 212 includes computer code, e.g., computing objects and associated functions adapted to facilitate retrieval of event messages (also simply referred to as events herein) from the message bus 232 and accompanying distributed database 74. Event messages retrieved by the fetch API and delivered to one or more subscribing collaborator clients 132 include event messages existing in a particular subscribed-to message bus and/or associated queue (i.e., a particular topic and partition of a message bus) after a specified position in a specified topic and partition of a queue of the message bus 232, e.g., as illustrated in FIG. 2. Position information characterizing a position of a particular event message is included in a message offset associated with a given message, e.g., event message stored at a particular position in a message bus queue.

The publish API or service 214 includes computer code enabling clients to publish, i.e., write event messages and/or other messages and accompanying data, to the message bus 232. Messages are written to a particular message bus queue, corresponding to a particular topic and partition of the message bus 232.

The topic configuration API 216 includes computer code enabling collaborator clients 132 to request and obtain configuration information pertaining to a particular topic of the message bus 232. The configuration information may include information specifying or otherwise describing a particular message bus topic. For example, the configuration information may include information indicating the number of partitions associated with or included within a particular topic.

The offset management API 218 includes computer code enabling efficient assignment and management of message offsets, which are assigned to each event message initiated from the collaborator clients 132 and/or retrieved from the distributed database action logs 234 as elements of the message bus 232. Note that details pertaining to selection and assignment of message offsets are implementation specific and may vary, depending upon the needs of a given implementation.

The client subscription library 220 includes computer code for implementing various event message dispatcher duties, including message buffering, event message deferral, Quality of Service (QoS) enforcement, and so on. Note that in certain instances, a particular topic and/or partition of a message bus may be overwhelmed by bursts of messages emanating from a particular client. In such cases, functionality provided by the client subscription library 220 may cause throttling of such messages, so as not to overwhelm the system 210. The processing and storage of such messages may be deferred or otherwise be selectively metered via functionality provided by the client subscription library 220, so as not to overwhelm the system 210.

The replication API 222 and/or service 222 includes computer code for implementing functionality enabling or facilitating the leveraging of function of an underlying distributed database, e.g., the distributed database 74, to replicate, i.e., copy data from a data center hosting the system 210 to a backup data center, i.e., a slave data center and accompanying message bus and associated server cluster(s).

The developer customization API 224 and/or service includes computer code for enabling developers to develop and deploy customized topics and/or partitions to the message bus 232. For example, a developer may wish to include an additional topic and/or partition in the message bus 232 to accommodate event messages from a newly developed web application that is designed to leverage functionality of the message bus system 64. The developer customization API 224 provides routines, function libraries, and so on, enabling developers to efficiently add custom topics and partitions to the message bus 232.

Communications from the API call processing system 66 and accompanying APIs 212-224 are routed through a message bus system controller 230. The message bus system controller 230 includes computer code for leveraging plural message bus servers and associated interfaces and accompanying load balancing, data replication, message coordination functionality, and so on, to facilitate exposing of the message bus 232 to the collaborator clients 132 via the APIs 212-224 of the API call processing system 66.

Note that while in the present example embodiment, the message bus 232 is shown as a separate module from the message bus system controller 230, that in certain implementations, the message bus 232 may be considered as part of the message bus system controller 230. The message bus 232 may represent a collection of abstracted queues, e.g., containing data from the distributed database action logs 234 of the distributed database 74, and arranged and accessible to clients 132 as one or more message busses 232 and associated message bus queues.

Note that the APIs 212-224 are merely examples and that other APIs and/or servers may be incorporated into the message bus system 64, without departing from the scope of the present teachings. For example, an additional synchronization API may be employed to facilitate synchronizing event messages associated with a particular user employing a particular collaborator client software 132 and associated accounts. Alternatively, or in addition, such synchronization functionality may be incorporated in one or more of the APIs and/or services 212-224, such as within the client subscription library 220.

Note that use of event message throttling, e.g., as may be implemented via the client subscription library 220, may facilitate preventing large batches of messages from clogging or excessively compromising system bandwidth and/or other system computing resources.

Conventionally, synchronizing collaboration folders for collaborators using conventional file collaboration systems was problematic. Multiple clients using multiple desktop synchronization communication links would each consume a queue of event message data, e.g., from an action log table of a collaboration database tier. Large sets of events arriving at the collaboration database can clog conventional systems with potentially millions of events.

The writing of a particular burst of events (e.g., as could be triggered by user deletion of a collaboration folder containing thousands of files) to a collaboration database (e.g., as opposed to the message bus system 64) could require a fanout of messages to thousands of servers, and the resulting writing or publishing of the associated event messages could require prohibitively lengthy time intervals. If the burst of messages was written to the collaboration database incorrectly, then any reloading of the messages into the processing pipeline could take too much time to be practical.

Use of the client subscription library 220 and accompanying message throttling and message deferral functionality enables deferring message writing to the message bus 232 and associated distributed database 232. Use of message bus queues of the message bus 232, as discussed herein, enable clients to be efficiently pointed backward in a particular queue, to enable the clients to collect past events, if such past events need further processing.

Note that in a conventional file collaboration database, after messages are read by a client from a queue, the messages are deleted from the queue. This is unlike how the message bus 232 handles messages in a queue, where messages read from a queue are copied from the queue, and the messages remain in the queue for a time interval dictated by the length of the queue and the rates that messages are written to the queue, in accordance with functionality implemented via the message bus system controller 230 and associated APIs and/or services 212-224.

Figure 8:
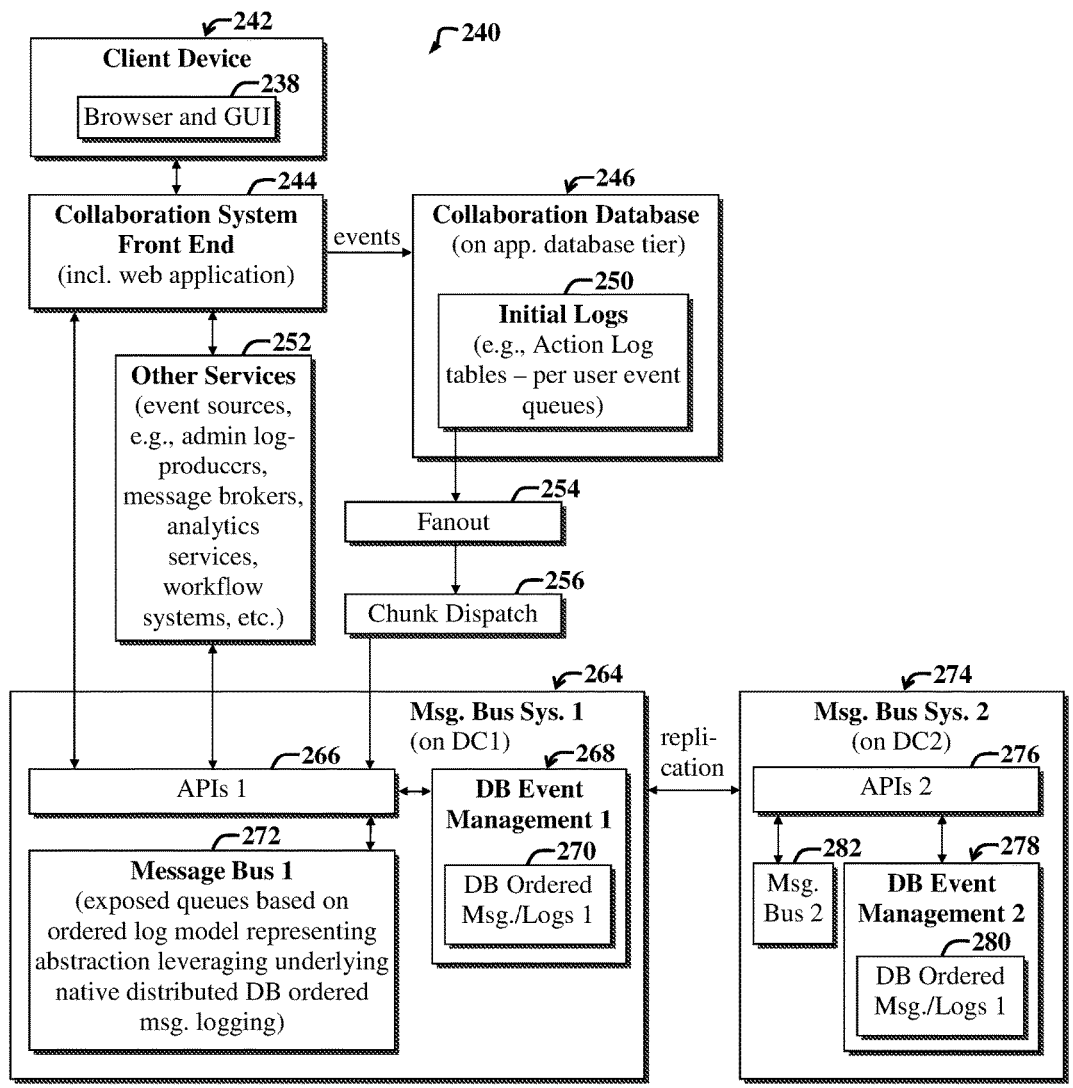
FIG. 8 is a block diagram of a third example embodiment, which includes a fanout dispatcher positioned between a collaboration database and a message bus system.

FIG. 8 is a block diagram of a third example embodiment of a computing environment implementing a file collaboration system 240 employing a message bus system 264, 274. The example file collaboration system 240 includes one or more client devices 242 employing one or more browsers and accompanying Graphical User Interfaces (GUIs) 238 to access a collaboration system front end 244 via a network, such as the Internet.

The collaboration system front end 244 may be implemented via one or more server systems in communication with a collaboration database 246 and a first message bus system 264. In the present example embodiment, the first message bus system 264 is operating in a master mode. When operating in the master mode the first message bus system 264 is configured to replicate or otherwise copy data maintained in ordered message logs 270 of a distributed database, the ordered message logs 270 of which are accessible to one or more APIs 266 of the first message bus system 264 via a first database event management system 268.

The APIs 266 include functionality for presenting a first message bus 272 to clients, e.g., the one or more client devices 242 and accompanying software 238 and collaboration system front end 244, leveraging underlying data 268 managed by the first database event management system 268.

In the present example embodiment, the collaboration system front end 244, which may be implemented via a collaboration web application, provides user access (i.e., collaborator access) to collaborations and associated collaboration folders in accordance with user permissions granted to collaborators via the collaboration system front end 244. Collaboration folders characterizing a particular collaboration may be initially maintained via a collaboration database 246.

The collaboration database 246 may collect records of events occurring per user per collaboration, as delivered to the collaboration database 246 via the collaboration system front end 244. The records of events are maintained via initial logs 250, e.g., action log tables for each collaborator user, wherein each action log table contains data to be exposed as a message bus queue of the first message bus system 264 to other clients (e.g., other services 252) in addition to the collaboration system front end 244.

In the present example embodiment, data maintained in the in initial event message logs 250 of the collaboration database 246 is fed to the first message bus system 264 via a fanout module 254 and a chunk dispatcher module 256. The fanout module 254 includes computer code for calculating to which message bus queues each portion of table data of the initial logs 250 should be delivered. The chunk dispatch module 256 then selectively groups or packages the fanned out messages for delivery in chunks to the first message bus system via the message bus APIs 266. Note that the chunk dispatcher 256 may be considered a client of the first message bus system 264, as may the other services 252, the collaboration system front end 244, and so on.

The first message bus system 264 then employs the APIs 266 to store received data, e.g., message chunks from the chunk dispatch module 256 and other event messages from other event sources and associated services 252, in the ordered message logs 270. Data from the ordered message logs 270 may then be selectively presented as the message bus 272 to clients, e.g., other services 252 and the collaboration system front end 244 for interaction therewith. The other services 252 may include administration log producers, other message brokers (e.g., Apache Kafka), analytics services for analyzing data in the message bus system 264 and associated function of the overall collaboration system 240, and so on.

As data, e.g., event messages, enter and eventually exit the first message bus 272, the data maintained in the first message bus 272 is replicated to the second message bus system 274, using a second set of APIs 276 running on the second message bus system 274 of a second data center. The second message bus system 274 acts as a slave to the first message bus system 264, such that in the event of failover, the second message bus system 274 can begin acting as a master message bus system, thereby servicing the client systems 244, 252, 246, and so on.

Replication may involve employing the second message bus system APIs 276 to enable replication of data maintained via the first set of ordered message logs 270 to the second set of ordered message logs 280 maintained by the second message bus system 274, also called the slave message bus system. Note that the first message bus system 264 and the second message bus system 274 may run on separate server clusters running in separate data centers.

Note that in certain implementations, the collaboration database 246 (e.g., as may be implemented via a MySQL database) can be bypassed by the collaboration system front end 244, which may instead log data directly into the message bus system 264 or via a separate fanout and/or chunk dispatcher. Furthermore, both administration logs and event logs may be fed to and accommodated as message bus queues of the message bus 272, without requiring separate database mechanisms for maintaining the separate administration logs and event logs.

Note that by obviating the use of the initial logs 250 of the collaboration database 246 as a source of all event messages occurring in a file collaboration system, and instead using queues in memory implemented via the message bus 272 and message bus system 264, overall collaboration system performance is enhanced.

Note that client read message queue position and/or publish queue position of different clients interacting with the message bus system 264 may be tracked via the message bus system 264 and accompanying APIs 266. This facilitates development of client software that can effectively use the message bus 272 and accompanying systems 264, 274.

Various embodiments discussed herein, including the example system 240, enable handling and tracking events occurring in a computing environment and adding and removing client subscribers to events of a message bus queue, e.g., message bus topic and partition. Embodiments may generally address the need for effective server cluster and/or data center failover without dropping or losing messages during the failover process; the need to collect messages from disparate systems and computing environments and to provide access to the messages at a convenient location of other processes of the computing environment to access and contribute to; the need for efficient horizontal scalability and mechanisms for adding new clients to add and/or subscribe to data provided by the system; and so on.

Conventionally, each client interacting with event message data of a file collaboration system required tedious custom coding, and required that the developers be intimately aware of message stream or queue semantics, as conventional message streams often lacked efficient mechanisms for enabling tracking of client read and/or write (i.e., fetch and/or publish) positions in a given stream of queue of data. Various embodiments discussed herein address such issues.

Figure 9:
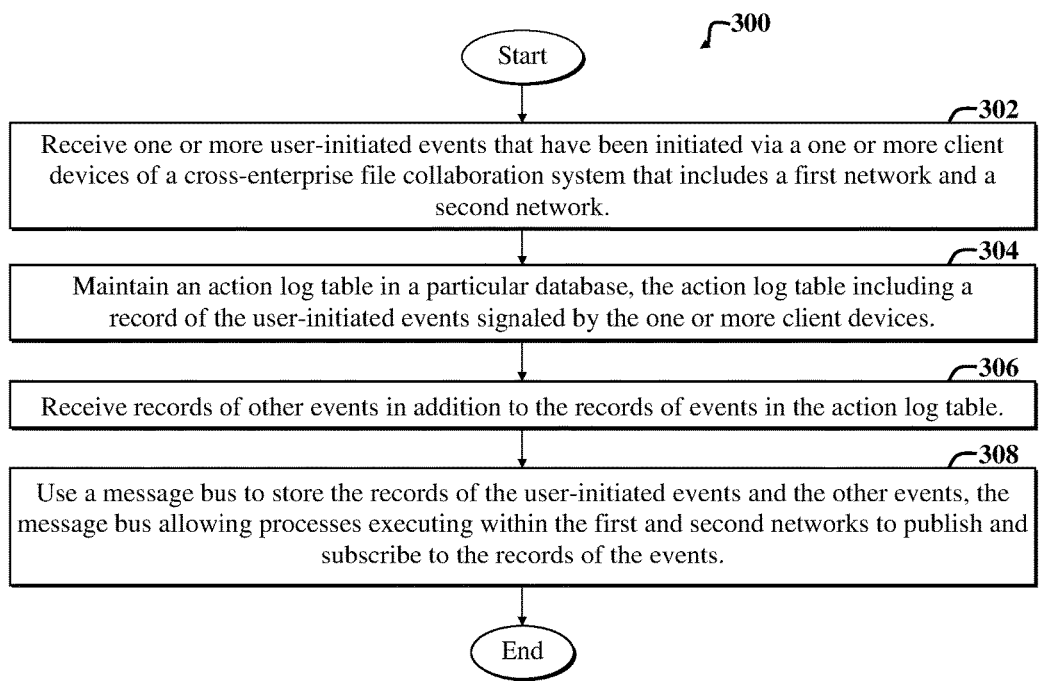
FIG. 9 is a flow diagram of a first example method implementable via the embodiments of FIGS. 1-8.

FIG. 9 is a flow diagram of a first example method 230 implementable via the embodiments of FIGS. 1-8. The first example method 300 facilitates distributing event messages in a cross-enterprise file collaboration system that includes one or more server computers in communication with one or more client devices, wherein the client devices include a first group of client devices (e.g., the client devices 62 of FIG. 3) on a first network (e.g., a network represented via the first message bus system data center 64 of FIG. 3) and a second group of client devices (e.g., the client devices 82) on a second network (e.g., a network represented via the second message bus system data center 84 of FIG. 3).

Note that for the purposes of the present discussion, a first network may be a first grouping of networked computing resources, and a second network may be a second grouping of networked computing resources. In general, a computing resource may be a computing resource may be any component, mechanism, or capability or quantities thereof of a computing environment, including, but not limited to, processors, memories, software applications, user input devices, and output devices, servers, and so on.

The first example method 300 includes a first receiving step 302, which involves receiving one or more user-initiated events. Note that user-initiated events may represent and/or may otherwise be identified by event messages in various embodiments discussed herein. Such events or event messages may include events issued by analytics software, job or task scheduling software for concurrent computing applications, and so on, and are not necessarily limited to user events or associated messages provided by an action log framework or file collaboration system.

A second data maintaining step 304 includes maintaining an action log table in a particular database, the action log table including a record of the user-initiated events signaled by the client devices. For the purposes of the present discussion, an action log table may be any table of a database that stores event messages pertaining to actions or activities occurring in a file collaboration system.

A third record receiving step 306 includes receiving records of other events in addition to the records of events in the action log table.

A fourth using step 308 includes using a message bus to store the records of the user-initiated events and the other events, the message bus allowing processes executing within the first and second networks to publish and subscribe to the records of the events. Note that in certain implementations, one network is used as a replication target, i.e., servers thereof receive replicated data from the first network, and clients communicate with the first network until a failover to the second network occurs.

Note that the method 300 may be modified, without departing from the scope of the present teachings. For example, the first example method 300 may be further augmented to specify an additional step involving determining when a collection of events intended for processing by the message bus is greater than a predetermined threshold; and in response to the determining, deferring processing of at least a portion of the collection of events. The deferring may be performed in accordance with one or more Quality of Service (QoS) rules.

The method 300 may further specify that the particular database represents a repository for collecting data pertaining to events facilitated via collaboration web application. The message bus may be implemented at least in part using a distributed database.

The first example method 300 may further specify that a subscription library is used to dispatch event records from the message bus. The other events may include one or more events from server administration software. The one or more events may further include administration logs associated with the server administration software.

The other events may further include one or more events from a message broker (e.g., another message bus or message broker, e.g., Apache Kafka) that represents a client message bus or message broker. The other events may further include one or more events from analytics software, workflow software, and so on. The one or more events from workflow software may include indications of one or more software tasks to be implemented via one or more clients in communication with the message bus.

The first example method 300 may be further modified to include a step of employing a message bus service or API to generate an abstraction of one or more log files maintained via a distributed database, the abstraction representing the message bus. The message bus service may provide or represent one or more APIs usable by one or more clients in communication with the message bus. The one or more APIs may include publish, fetch, configuration, and client subscription APIs and/or services. Another offset management API or service may include functionality for facilitating management and assignment of message offsets to messages in the message bus.

The client subscription API or service may include or provide functionality for facilitating implementation of event message deferral, e.g., in response to bursts of messages arriving into a message bus system. Such event message deferral may be performed in accordance with one or more QoS rules.

The first example method 300 may further include or otherwise be replaced by the following steps: receiving one or more events; maintaining records of events signaled by client devices; and using a message bus to store the records, the message bus allowing processes to access the records.

Another example step 300 or method includes employing a distributed database to expose a message bus as a message bus abstraction of underlying data maintained by the distributed database; using a service that exposes APIs to client software, so as to generate the message bus abstraction; the APIs of which are employed to wrap or otherwise encapsulate or act as a client interface with the distributed database to enable exposing of the message bus abstraction to client software interacting with the message bus abstraction.

Figure 10:
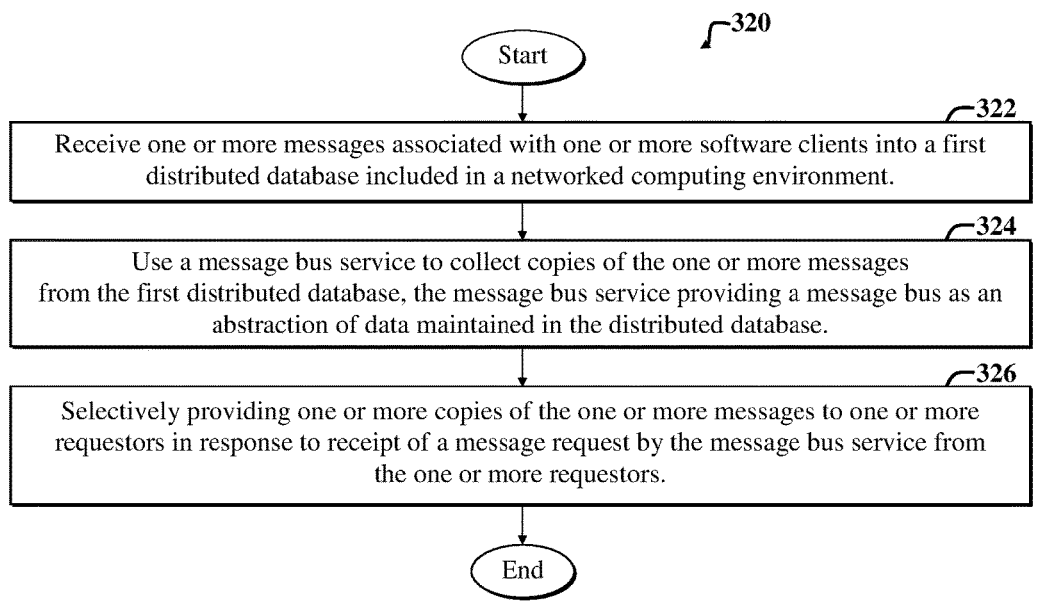
FIG. 10 is a flow diagram of a second example method implementable via the embodiments of FIGS. 1-8.

FIG. 10 is a flow diagram of a second example method 320 implementable via the embodiments of FIGS. 1-8. The second example method 320 facilitates client access to messages generated in a networked computing environment.

An initial receiving step 322 includes receiving one or more messages associated with one or more software clients into a first distributed database included in the networked computing environment.

Subsequently, a using step 324 includes using a message bus service and/or API to collect copies of the one or more messages from the first distributed database. The message bus service may provide the message bus as a message bus as an abstraction of data maintained in the distributed database. For the purposes of the present discussion, a message bus abstraction may be any presentation of a queue with event messages, where the event message data is maintained in an underlying database used to populate one or more positions of a queue of the message bus from the perspective of a client interacting with the message bus.

Next, a data providing step 326 includes selectively providing one or more copies of the one or more messages to one or more requestors (i.e., clients using a fetch API of a message bus system) in response to receipt of a message request by the message bus service from the one or more requestors.

Note that the second example method 320 may be modified, without departing from the scope of the present teachings. For example, the method 320 may be augmented to further specify employing the message bus service to implement a message bus using data storage functionality of the distributed database.

The networked computing environment may include a collaborative file sharing system that provides one or more cloud services. For the purposes of the present discussion, a cloud service may be any mechanism (e.g., one or more web services, APIs, etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

The second example method 320 may be further modified to specify that the collaborative file sharing system includes a web application in communication with a collaboration database. The collaboration database may include one or more log files that maintain or include metadata about one or more events associated with each collaborator of the collaborative file sharing system.

The one or more events associated with each collaborator may include synchronization events associated with a collaboration that is associated with one or more folders maintained via the web application and the collaboration database.

The receiving step 322 may further include receiving one or more event messages from the collaboration database into the distributed database; and employing a load balancer to facilitate distribution of the one or event messages to one or more servers of the distributed database. Each of the one or more servers of the distributed database may include an instance of the message bus service that wraps an instance of the distributed database or portion thereof.

The second example method 320 may further include facilitating horizontal scalability of the message bus by selectively adding one or more partitions to a given message topic maintained via the message bus. Each of the one or more partitions may represent a section of a keyspace characterizing the distributed database. The method 320 may further include transparently distributing the one or more partitions across one or more nodes (e.g., servers) of the distributed database.

The one or more software clients may include the one or more requestors, whereby a given client may act to both write data to and fetch data from the distributed database via the message bus service. The distributed database appears as, i.e., is presented as (e.g., via one or more APIs) a message bus to the one or more software clients that access the message bus service to write data thereto or fetch data therefrom. The one or more requestors includes analytics software, system administrator software, developer software, and so on.

The example method 320 may further include employing the message bus service to expose one or more APIs to the one or more clients to enable client access to one or more message busses exposed by the message bus service. The message bus service may be further adapted to expose one or more APIs as a client interface to the distributed database, thereby presenting, to one or more clients communicating with the one or more APIs, one or more log files maintained by the distributed database as one or more message busses and/or message bus queues thereof.

The distributed database may include an Apache HBase database running on a first data center. Alternatively, or in addition, the distributed database may include a message broker, e.g., Apache Kafka.

The one or more messages may characterize one more events associated with the one or more software clients, wherein the one or more events include an event characterizing a process in the networked computing environment. The one or more clients may be associated with one or more collaborators that are collectively associated with a folder (called a collaboration folder) of a file collaboration system. The process may include, for example, a file upload process that involves the uploading of a file to the folder by one or more collaborators using a client of the one or more clients. Additional examples of processes include a file download process, a comment creation process, a process for removing a collaborator from a collaboration hosted by the file collaboration system, and so on.

The providing step 326 may further include copying a message from a message bus provided via the message bus service, and then delivering the copied message to the one or more requestors, the one or more requestors including a requestor that acts as a client to the message bus service.

The second example method 320 may further include employing the message bus service to allocate a single client to write to a single partition of the message bus. One or more load balancers may be employed to facilitate selectively limiting and/or otherwise controlling message traffic directed toward a single server. The message bus service may include computer code for facilitating client message bus queue position tracking.

The first sever cluster may be maintained via a first data center. The second server cluster may be maintained via a second data center in communication with the first data center. The second example method 320 may further include replicating content of a first message bus hosted by the first server cluster to a second message bus hosted by the second server cluster. Content replication may further include incrementing a number (e.g., epoch identifier) each time a failover occurs between the first data center and the second data center.

Figure 11:
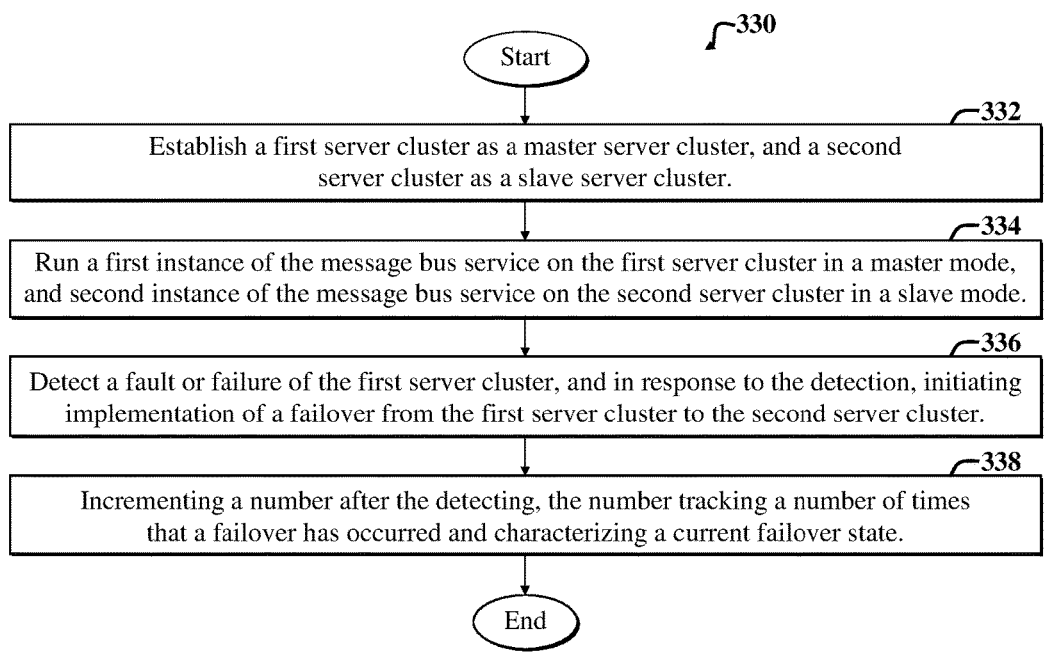
FIG. 11 is a flow diagram of a third example method implementable via the embodiments of FIGS. 1-8.

FIG. 11 is a flow diagram of a third example method 330 implementable via the embodiments of FIGS. 1-8. The third example method 330 facilitates server cluster failover for a message bus service.

The third example method 330 includes a first step 332, which involves establishing a first server cluster as a master server cluster, and a second server cluster as a slave server cluster.

A second step 334 includes running a first instance of a message bus service on the first server cluster in a master mode, and second instance of a message bus service on the second server cluster in a slave mode.

A fourth step 336 includes detecting a fault or failure of the first server cluster, and in response to the detection, initiating implementation of a failover from the first server cluster to the second server cluster.

A fourth step 338 includes incrementing a number after the detecting, the number tracking a number of times that a failover has occurred and characterizing a current failover state (e.g., whether the state is characterized by a first data center operating in a master mode and a second data center operating in a slave mode, and/or vice versa).

The third example method 330 may be altered without departing from the scope of the present teachings. For example, the third step 336 and fourth step 338 may be replaced with detecting a fault or failure of the first server cluster, and in response to the detection, performing the following to facilitate implementing a failover: selectively switching a state of the second server cluster from a slave state to a master state, such that the second server cluster becomes a master server cluster; switching a state of the first server cluster from a master state to a slave state, such that the first server cluster becomes a slave server cluster; selectively changing a mode of the second message bus service from the slave mode to a master mode; changing a mode of the first message bus service from the master mode to a slave mode; and incrementing a number after the detecting, the number tracking a number of times that a failover has occurred and characterizing a current failover state (e.g., whether a particular server cluster or data center is in a slave mode or a master mode or state).

The third example method 330 may be further augmented to specify that the number includes an epoch identifier as a prefix to one or more messages transferred between the first server cluster and the second server cluster via the first message bus service or the second message bus service. The fourth step 338 may further include incrementing the epoch identifier each time a master slave cluster switches states to become a slave server cluster.

The third example method 330 may further include employing the first message bus service and the second message bus service to incorporate both the epoch identifier and a message position number for each of the one or more messages. Upon initiation of the failover in response to the detecting implemented in the third step 336, the method 330 may include employing the second server cluster as a master server cluster to append any messages not received from the first server cluster before initiation of the failover.

The third example method 330 may further include employing the first instance of the message bus service to facilitate replication of a first set of message buses across one or more message bus servers of the first server cluster; and using the second instance of the message bus service to facilitate replication of a second set of message buses on one or more message bus servers of a second data center.

Event messages and/or other messages may be routed through a master message bus cluster using the first message bus service. The master message bus cluster may include primary message bus server (also called VIP message bus server or a parent message bus server) in communication with one or more slave message bus servers (also called child message bus servers). Each slave message bus server may be configured to receive one or more messages for replication from a different distributed database server.

Although the description has been described with respect to particular embodiments thereof, these particular embodiments are merely illustrative, and not restrictive. For example, while various embodiments pertain to facilitating selectively transferring log data from a message stream or queue from a message bus operating in a cloud-based file collaboration computing environment, embodiments are not limited thereto. For example, environments other than file collaboration computing environments may leverage data transfer framework functionality discussed herein to facilitate interception and use of data from a message bus, e.g., for software task scheduling to facilitate concurrent computing applications.

Furthermore, embodiments are not limited to use of a message bus system to receive output from an action log table that records information pertaining to user initiated events in a networked computing environment. For example, implementations of the message bus system may handle event messages issued by or dispatched to analytics software, job scheduling software, and so on.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for distributing event messages in a cross-enterprise file collaboration system, the system including one or more server computers in communication with one or more client devices, wherein the client devices include a first group of client devices on a first enterprise network and a second group of client devices on a second enterprise network, wherein the client devices gain access to the cross-enterprise file collaboration system by subscribing to a particular suite of cloud services, the method comprising the following performed by the one or more server computers:
   receiving one or more user-initiated electronic document processing events from a first enterprise file collaboration system on the first network;
   maintaining an action log table in a particular database, the action log table including a record of the user-initiated electronic document processing events;
   receiving records of other events from a second enterprise file collaboration system on the second network in addition to the records of events in the action log table; and
   using a message bus to store the records of the user-initiated electronic document processing events and the other events, the message bus providing one or more application programming interfaces usable by the one or more client devices in communication with the message bus via the message bus service, wherein the one or more application programming interfaces include one or more of publish, fetch, configuration, and subscription operations to facilitate collaboration on an electronic document between the users in the at least two different enterprises.

2. The method of claim 1, further comprising:
   determining when a number of collected events intended for processing by the message bus is greater than a predetermined threshold; and
   in response to the determining, deferring processing of one or more of the collected events.

3. The method of claim 2, wherein the deferring is performed in accordance with one or more quality of service rules.

4. The method of claim 1, wherein the particular database represents a repository for collecting data pertaining to events facilitated via a collaboration application.

5. The method of claim 1, wherein the message bus is implemented at least in part using a distributed database.

6. The method of claim 1, further including a subscription library for dispatching event records from the message bus.

7. The method of claim 1, wherein the other events include one or more events from server administration software, the one more events documented via administration logs associated with the server administration software.

8. The method of claim 1, wherein the other events include one or more events from a client message bus.

9. The method of claim 1, wherein the other events include one or more events from analytics software.

10. The method of claim 1, wherein the other events include one or more events from workflow software.

11. An apparatus for distributing log information in a cross-enterprise file collaboration system, the system including one or more server computers coupled to one or more client devices, wherein the client devices include a first group of client devices on a first enterprise network and a second group of client devices on a second enterprise network, wherein the client devices gain access to the cross-enterprise file collaboration system by subscribing to a particular suite of cloud services, the apparatus comprising:
a digital processor coupled to a display and to a non-transitory processor-readable storage device, wherein the non-transitory processor-readable storage device includes one or more instructions executable by the digital processor to perform the following acts:
receiving one or more user-initiated electronic document processing events from a first enterprise file collaboration system on the first network;
maintaining an action log table in a particular database, the action log table including a record of the user-initiated electronic document processing events;
receiving records of other events from a second enterprise file collaboration system on the second network in addition to the records of events in the action log table; and
using a message bus to store the records of the user-initiated electronic document processing events and the other events, the message bus providing one or more application programming interfaces usable by the one or more client devices in communication with the message bus via a message bus service, wherein the one or more application programming interfaces include one or more of publish, fetch, configuration, and subscription operations to facilitate collaboration on an electronic document between the users in the at least two different enterprises.

12. The apparatus of claim 11, wherein the non-transitory processor-readable storage device further includes one or more instructions executable by the digital processor to perform the following acts:
determining when a number of collected events intended for processing by the message bus is greater than a predetermined threshold; and
in response to the determining, deferring processing of one or more of the collected events.

13. The apparatus of claim 12, wherein the deferring is performed in accordance with one or more quality of service rules.

14. The apparatus of claim 11, wherein the particular database represents a repository for collecting data pertaining to events facilitated via a collaboration application.

15. The apparatus of claim 11, wherein the message bus is implemented at least in part using a distributed database.

16. A non-transitory processor-readable storage device including instructions executable by a digital processor, the processor-readable storage device including one or more instructions for:
receiving one or more user-initiated electronic document processing events from a first enterprise file collaboration system on the first network;
maintaining an action log table in a particular database, the action log table including a record of the user-initiated electronic document processing events;
receiving records of other events from a second enterprise file collaboration system on the second network in addition to the records of events in the action log table; and
using a message bus to store the records of the user-initiated electronic document processing events and the other events, the message bus providing one or more application programming interfaces usable by one or more client devices in communication with the message bus via a message bus service, wherein the one or more application programming interfaces include one or more of publish, fetch, configuration, and subscription operations to facilitate collaboration on an electronic document between the users in at least two different enterprises.

17. The non-transitory processor-readable storage device of claim 16, further includes one or more instructions executable by the digital processor for:
determining when a number of collected events intended for processing by the message bus is greater than a predetermined threshold; and
in response to the determining, deferring processing of one or more of the collected events.

18. The non-transitory processor-readable storage device of claim 17, wherein the deferring is performed in accordance with one or more quality of service rules.

19. The non-transitory processor-readable storage device of claim 16, wherein the particular database represents a repository for collecting data pertaining to events facilitated via a collaboration application.

20. The non-transitory processor-readable storage device of claim 16, wherein the message bus is implemented at least in part using a distributed database.

* * * * *